United States Patent
Novikov-Kopp

(10) Patent No.: US 8,657,053 B2
(45) Date of Patent: Feb. 25, 2014

(54) METHOD FOR COMPREHENSIVELY INCREASING AERODYNAMIC AND TRANSPORT CHARACTERISTICS, A WING-IN-GROUND-EFFECT CRAFT FOR CARRYING OUT SAID METHOD (VARIANTS) AND A METHOD FOR REALIZING FLIGHT

(76) Inventor: Ivan Novikov-Kopp, Sarrlouis (DE)

( * ) Notice: Subject to any disclaimer, the term of this patent is extended or adjusted under 35 U.S.C. 154(b) by 152 days.

(21) Appl. No.: 13/142,884

(22) PCT Filed: Jan. 5, 2010

(86) PCT No.: PCT/IB2010/000032
§ 371 (c)(1),
(2), (4) Date: Jun. 30, 2011

(87) PCT Pub. No.: WO2010/076776
PCT Pub. Date: Jul. 8, 2010

(65) Prior Publication Data
US 2011/0266081 A1    Nov. 3, 2011

(30) Foreign Application Priority Data
Jan. 5, 2009 (DE) .......... 10 2009 004 239

(51) Int. Cl.
*B60V 1/00* (2006.01)
(52) U.S. Cl.
USPC .......................................... 180/117; 180/116
(58) Field of Classification Search
USPC ......... 180/126, 116, 117, 119, 120; 114/67 A
See application file for complete search history.

(56) References Cited

U.S. PATENT DOCUMENTS

| 3,244,246 A | | 4/1966 | Weiland |
| 3,366,195 A | * | 1/1968 | Warner et al. ................. 180/120 |
| 3,401,766 A | * | 9/1968 | Laufman et al. .............. 180/119 |
| 3,608,662 A | * | 9/1971 | Ferguson ....................... 180/117 |
| 5,105,898 A | * | 4/1992 | Bixel, Jr. ........................ 180/117 |
| 6,158,540 A | * | 12/2000 | Rice et al. ...................... 180/117 |
| 6,719,079 B2 | * | 4/2004 | Jones ............................ 180/126 |
| 7,059,259 B2 | * | 6/2006 | Allen ........................... 114/67 A |
| 7,291,854 B2 | * | 11/2007 | Bichay ........................ 250/517.1 |
| 2004/0050602 A1 | * | 3/2004 | Jones ............................ 180/116 |
| 2005/0183898 A1 | | 8/2005 | Martirosov et al. |

FOREIGN PATENT DOCUMENTS

| DE | 2303972 A | 9/1975 |
| DE | 3843231 A1 | 6/1990 |
| RU | 2099217 C1 | 12/1997 |
| RU | 2254250 C2 | 6/2005 |

* cited by examiner

*Primary Examiner* — Tony Winner
(74) *Attorney, Agent, or Firm* — David A. Guerra

(57) ABSTRACT

The group of inventions relates to aviation and to transport means having (static and dynamic) air discharge, in particular to self-stabilizing wing-in-ground-effect craft of types A, B and C. The following technical results are achieved: increased flight safety and maneuvering safety, increased load-bearing capacity and flight height in ground effect mode, reduced dimensions, improved take-off and landing characteristics, as well as amphibian characteristics and economic efficiency, increased functionality and a wider range of operational alignments, and greater ease of use and maintenance. This result is achieved by simultaneously applying the methods for generating a system of aerodynamic forces, the structural solutions and the piloting methods conceptually linked therewith which are proposed in the present group of inventions to "flying wing" or "composite wing" design layouts.

20 Claims, 22 Drawing Sheets

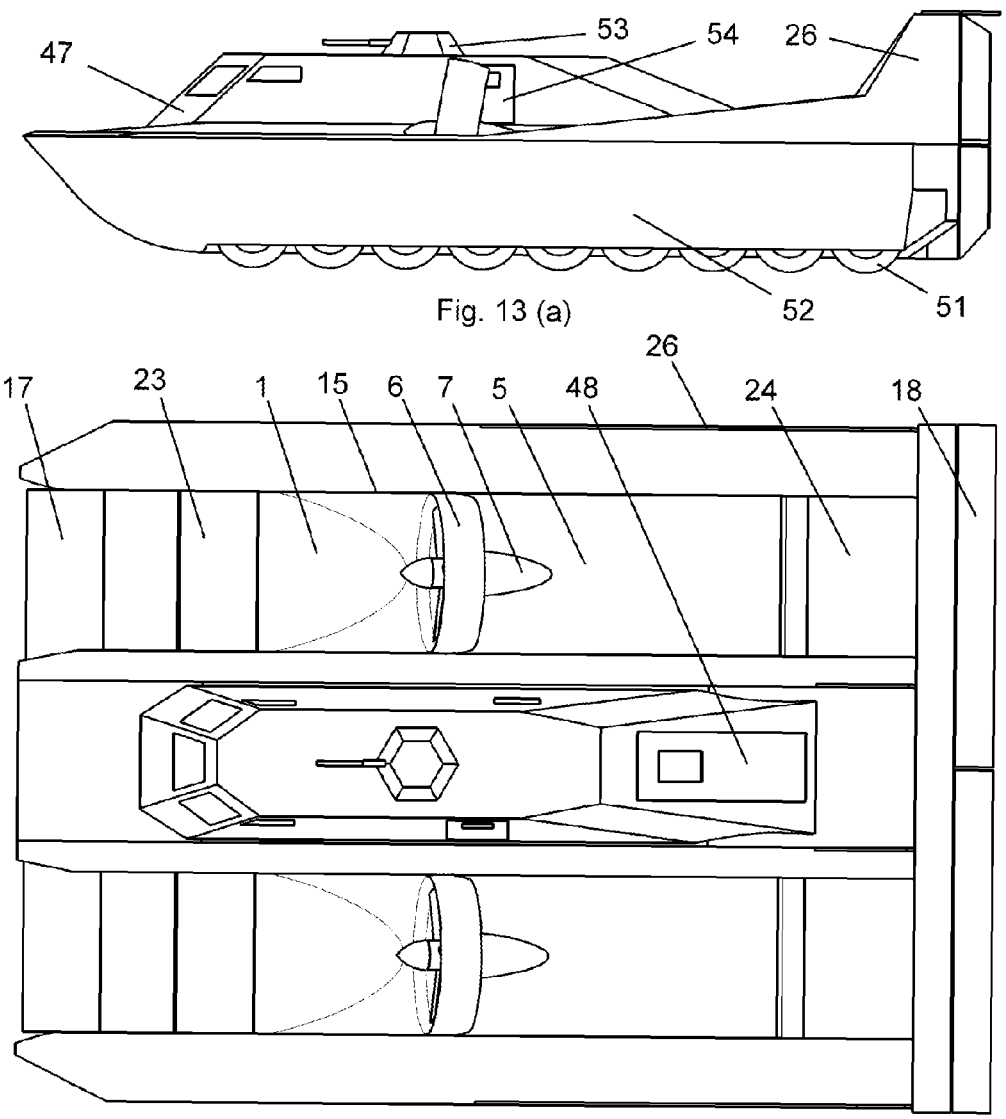
Fig. 13 (a)
Fig. 13 (b)
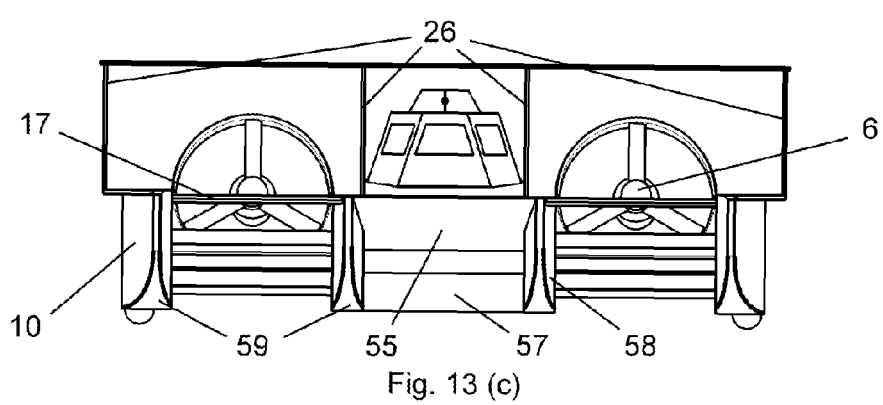
Fig. 13 (c)

METHOD FOR COMPREHENSIVELY INCREASING AERODYNAMIC AND TRANSPORT CHARACTERISTICS, A WING-IN-GROUND-EFFECT CRAFT FOR CARRYING OUT SAID METHOD (VARIANTS) AND A METHOD FOR REALIZING FLIGHT

CROSS-REFERENCE TO RELATED APPLICATIONS

This application is an U.S. national phase application under 35 U.S.C. §371 based upon International Application No. PCT/IB2010/000032 filed on Jan. 5, 2010. Additionally, this U.S. national phase application claims the benefit of priority of International Application No. PCT/IB2010/000032 filed on Jan. 5, 2010, and German Application No. 10 2009 004 239.3 filed on Jan. 5, 2009. The entire disclosures of the prior applications are incorporated herein by reference. The international application was published on Jun. 8, 2010 under Publication No. WO 2010/076776.

DESCRIPTION OF THE INVENTION

1. Field of the Invention

This set of inventions relates to aviation and to vehicle with static and dynamic air discharge, in particular, to ships, boats and amphibious transportation platforms, aircraft, amphibian aircraft and wing-in-ground-effect craft. Versions of preferred embodiment of this group of inventions are self-stabilizing wing-in-ground-effect craft, types A, B and C, therefore, further explications are based on example of wing-in-ground-effect (WIG) craft.

2. Background and the Prior Art

Studies of ground ("wing-in-ground") effect and construction of wing-in-ground effect craft have more than 70 years in existence. However, no widely-used wing-in-ground effect craft still exists that could offer safety and/or cargo efficiency and/or ease of operation compared to those of conventional aircraft or ships, since no acceptable integral engineering solution has been proposed to meet main challenges associated with operations of WIG craft, that is, longitudinal stability, seaworthiness and amphibian properties, implemented in design combining ease of use and maintenance.

A key distinctive feature of wing-in-ground effect craft operation consists in that main operating height, i.e., height of flying in ground effect mode, is less than length of wing mean aerodynamic chord (MAC) in actual flight (0.1-0.3), while airspeed varies from 150 to 600 km/h that corresponds to aircraft speeds. Besides, aerodynamic forces and moments affecting pitch control feature somewhat complicated nature of dependence on flight parameters and, what is more important, they boast higher gradients of change.

Widely-used methods of providing longitudinal stability in tight time flight nearby water or ground surface minimizing decision-making interval may and, in fact, do cause crashes. This is due to development of emergent conditions in fractions of seconds at external disturbances or in faulty control over craft. Most known emergencies and crashes of wing-in-ground effect craft, both in flight tests and in service, both light and heavy craft, have been in some way related with longitudinal stability and controllability. Wing-in-ground effect craft designed by widely-known designers A. Lippisch and R. Alexeyev match the situation.

It is known in the art, for example, N. Belavin "Wing-in-ground effect craft." Leningrad, Sudostroenije, 1968 [1], that the problem of WIG craft stability in ground effect flight may be resolved either through choice of aerodynamic configuration or automated control system. However, one of the requirements contained in para. 15.2.2. of Chapter 15 Aerodynamic Stabilization Systems of Interim Guidelines for Wing-in-Ground (WIG) craft approved by IMO Safety Committee in December 2002 reads: "In the case of a failure of any automated equipment or device that makes a part of stabilization system, or its power drive, parameters of WIG craft movement must always stay within safe limits.", p. 391. A. I. Maskalik et al, "WIG Craft—Transports of the XXI Century." St. Pb., Sudostroenije, 2005, further in this text referred to as [2]. It means that a wing-in-ground effect craft should have "intrinsically" safe design, i.e., feature static and dynamic self-stabilization capability, and Automated Control Systems (ACS) should be used only as a tool to ensure accurate maintenance of flight parameters and to reduce crew workload.

In fact, these requirements are similar to requirements to stabilization systems used in aircraft. But in aircraft of any aerodynamic configuration longitudinal static stability is ensured by selecting proper center-of-gravity position, because aerodynamic forces in aircraft develop and vary in two-component "air stream-wing" dynamic system. Additionally, lift within range of flight angles of attack depends linearly on angle of attack. Of principal importance here are the facts that currently existing aircraft designs are necessary and sufficient for specified level of safety, and "air stream-wing" dynamic system is isolated from the ground. In flight at safe altitudes, actual deviations from the set altitude due to various external disturbances, including crash risks, vary from several meters to several tens of meters (in severe turbulence conditions), which is by two or three orders of magnitude smaller than the current flight altitude and, therefore, there is no threat to flight safety due to fluctuations in flight altitude.

On the contrary, lift of the wing in WIG craft in ground effect zone depends notable on, apart from provision of nonlinear dependence on angle of attack, the distance to supporting surface. Note here that height variations may reach a value smaller than wing Mean Aerodynamic Chord (MAC), while the lifting force may show almost twofold variation. For example, for heavy WIG craft Orlyonok (140 t) and Lun' (400 t) reduction in relative height above water surface from 0.9 to 0.1 MAC leads to exponential growth of wing-lift coefficient Cy by 90% (see FIG. 57, page 41 [2]). In case angle of attack increases simultaneously, then Cy increases to a greater extent and at a higher rate. Thus, two-element dynamic system "air stream—wing" in flight in ground effect mode is complemented by third element, hence becoming a three-element "air stream—wing—supporting surface" system. Relationship between the initial system and new element may be characterized as "supercritical" one since, apart from the increase in wing lift variation gradient, there is a considerable displacement of the center of pressure. At the same time, shift of the center of pressure towards trailing edge of the wing creates uncompensated negative pitch moment, i.e. wing-in-ground effect craft represents a highly nonlinear system.

Another factor detrimental to flight safety, seaworthiness performance and fuel efficiency directly related to pitch control is the flight control method. Basically, the method used for WIG craft operations is the same as for airplanes, i.e. in order to take off a WIG craft should accelerate to liftoff speed and at the same time vary its pitch angle so as to gain the required lift. Further, during all flight phases up to and including landing, relevant variations of pitch angle are still required. The challenge is high risks in maneuvers involving pitch angle variations at heights comparable to length of the aerial vehicle. This is confirmed by both accidents with WIG craft and numerous airplane crashes and emergencies that have occurred in take-off and landing.

Another important characteristic of WIG craft is seaworthiness. On the one hand, it is limited by emergence of high impact loads during take-off and landing in heavy sea conditions which may lead to damage and disruption of structure, and also to development of forces and moments that prevent the craft from reaching liftoff speed and disrupt hydrodynamic conditions that are necessary for safe completion of take-off or landing. On the other hand, seaworthiness is limited by effective relative height of ground effect flight which depends on WIG craft geometry, that is, overall length and width of its airfoil (length of MAC). That is, solution to both the problems of seaworthiness and that of longitudinal stability consists in selecting methods of generating hydrodynamic forces and selecting aerodynamic configuration.

Amphibiousness is also directly dependent on aerodynamic configuration of WIG craft. Aerodynamic configuration determines operational capabilities of wing-in-ground effect craft as an alternative transportation system. Full amphibiousness enables transportation services to areas that are inaccessible to conventional vessels and airplanes and thus provides a more cost-efficient alternative to helicopters and also offers an increased flight range. Additional advantage is ease of practical use and maintenance.

Therefore, in principle, problems of safety and efficiency of wing-in-ground effect craft could be resolved only through choice of a particular aerodynamic configuration that would allow creating specified system of aerodynamic forces and performing flight according to safe algorithms.

A number of aerodynamic configurations are known in the art; however, among configurations that have been embodied and tested, following characteristic types are distinguished:

WIG craft based on aircraft configuration by R. Alekseyev, KM-Type wing-in-ground effect craft, with a system for boosting pressure under airfoil with slipstreams (jets) from engines—FIG. 65, [2], RU Patent 2076816 (craft constructed in Russia, Sweden and China)

WIG craft based on airplane-type configuration by A. M. Lippisch with dome-shaped "Reverse Delta" wing, —U.S. Pat. No. 3,190,582, Yu. Makarov—RU Patent 2185979, (constructed in: Germany, USA, Australia, Taiwan, China and Russia);

WIG cutters according to wing configuration of the "Tandem" type with gliding hulls of cutter type: C. W. Weiland—U.S. Pat. No. 3,244,246, G. Joerg—U.S. Pat. No. 3,908,783, A. Blum U.S. Pat. No. 5,335,742 (constructed in: USA and Germany);

WIG craft according to "Composite Wing" configuration: R. Bartini—Aerodynamic Wing-in-Ground Effect Craft 14 MP1P, (K. G. Udalov et al. "VVA-14 Airplane", Moscow, 1994, further in this text referred to as [8]), with pressure boost—ELA-01 (Tekhnika Molodyozhi>> No. 8, 2005, Russia, pp. 29-32, further in this text referred to as [9]) and "Ivolga-2" booster—V. Kalganov—RU Patent 2099217.

WIG craft of the ADP Series based on "Canard" configuration with lifting-type tail plane by A. Panchenkov, FIG. 7 ("Ekranoplani Ukraini", "Awiatsija obschego naznatschenija" Magazine No. 5 2000, further on—[11]), V. Surzhikov et al.—RU Patent 2224671;

WIG craft according to "Flying Wing" configuration: FIGS. 171, 172, 178 [2], OIIMF-2, FIG. 1.

It is also known in the art that, for intrinsic static and dynamic stability of a WIG craft to be achieved, the focus in terms of angle of attack must be located behind the focus in terms of height, and center of gravity must be located between these focuses, its preferred location being between the height focus and the point of midway between the focuses: FIG. 10 N. Kornev, <<COMPLEX NUMERICAL MODELING OF DYNAMICS AND CRASHES OF WING-IN-GROUND VEHICLES>> 41st Aerospace Sciences Meeting and Exhibit, 6-9 Jan. 2003, Reno, Nev., further on—[13], and Pages 121-122[2].

There are widely known ways to meet this condition in practice: V. Arkhangelsky—RU Patent 2018465, L. Novolotsky—RU Patent 209722, and also to meet conditions of self-stabilization of WIG craft of the "Canard" and "Tandem" types—RU Patent 2224671 and U.S. Pat. No. 3,908,783.

There is a known way to expand range of operational centers of gravity of an airplane through configuration of two wings according to "Tandem" aerodynamic configuration—A. Belosvet et al.—RU Patent 2102287;

Furthermore, it is known in the art that at same geometrical flight heights and with equal areas, low-aspect wings feature higher damping characteristics in terms of height that are proportional to partial derivative of lift force in terms of height.

There are known methods of creating a static air cushion (SAC):

Pressure boost with slipstream from thrust or start propulsion unit directed to a chamber (cavity) open at the front side that is created under the outer wings or under center wing—low-pressure SAC, FIG. 65, RU Patent 2099217;

Pressure boost to a chamber enclosed by perimeter that is located under center wing or under special structure, from additional engines and fans, ELA-01[2], V. Ignatyev—RU Patent 2174080, V. Morozov—RU Patent 2053903;

Pressure boost to perimeter-enclosed chamber from a separate fan with redistribution of engine power between the booster and thrust propulsion unit; V. Nazarov—RU Patent 21272202;

Pressure boost to perimeter-enclosed chamber (cavity) with full slipstream (jet) from thrust propulsion unit by way of deflecting propeller rotation plane, by O. Mikoyan et al.—Certificate of Authorship SU 1511170, A. Makiyenko et al, RU Patent 2139212;

Pressure boost to perimeter-enclosed chamber by way of directing a part of slipstream from thrust propulsion units, OIIMF-3 WIG Craft [11], Yu. Makarov—RU Patent 2185979-27.07.2002, R. Martirosov—RU Patent 2254250-20.06.2005, P. u. J. Rice U.S. Pat. No. 6,158,540.

There is a known way to enhance propeller thrust to up to 30% by application of "annular center wing" configuration—I. V. Ostoslaysky, V. R. Matveyev, works of the Central Aerohydrodynamics Institute (TsAGI) named after Prof. N. E. Zhukovsky. Issue 248. Moscow, 1935, further on—[27].

There are known ways to improve seaworthiness by:
Increasing dimensions of WIG craft;
Application of lines with great deadrise angles and steps;
Application of shock-absorbing deflectable hydroskis;
Application of high-pressure static air cushion;
Application of vertical take-off solution.

To evaluate known aerodynamic configurations against "intrinsic stability" (or "self-stabilization") criteria, following demonstrative comparison may be used:

Because the lower surface, and particularly its profile, plays the determining role in development of carrying properties of the wing closer to the air cushion (FIG. 95 and item 11 on Page 86, [2]), there is, as mentioned above, a "supercritical" relationship between the wing and the supporting structure through dynamic air cushion. In terms of mechanism of action of forces and moments, the "air stream-wing-supporting surface" system may be compared to a wheeled carriage used in ground vehicles. Hence, "Flying Wing" and "Composite Wing" layouts would correspond to single-axis carriage that is pushed (or pulled) and at the same time balanced, with its center of gravity located within a small range close to vertical imaginary axis drawn from the point of support. Gravity, thrust or balancing forces create moments around the point of support. Any change in magnitude of these forces is accompanied by progressing disturbance of previously established balance. Therefore, in the longitudinal direction, the single-axis carriage and aerodynamic configurations corresponding to it are unstable in principle.

"Tandem" and "Canard" aerodynamic configurations correspond to double-axis carriage with center of gravity located between the points of support. Double-axis carriage is stable in principle (i.e. intrinsically stable), and its longitudinal balance does not depend in practice on the point of application of the force of thrust (pull) and variations of its magnitude. Due to difference in nature of emergence of supporting forces between surface vehicles and aerial vehicles, "Tandem" and "Canard" configurations feature own longitudinal stability that is close to stability of double-axis carriage only under certain conditions.

Therefore, similarly to surface transport, all aerodynamic configurations may be conventionally classified into "single-axis" and "double-axis" ("multi-axle") categories, and the "multi-support" (or "multi-axle") principle should be preferable for design of aerial vehicles utilizing wing-in-ground effect.

Based on the above, known aerodynamic configurations may be compared in terms of solutions to key challenges in design of WIG craft.

Double-axis "Tandem" and "Canard" designs feature intrinsic characteristics required for achievement of self-stabilization. But this type of WIG craft also has substantial disadvantageous features, i.e. necessity in take-off run, fine tuning to a particular speed and height or narrow range of variations thereof, very low effective height of ground effect flight (in relation to overall length of the vehicle) which considerably limits seaworthiness. Additionally, there is no amphibiousness at all or there is limited amphibiousness that requires slips with hard surface or shallow angles of ascent. No capability of operating a flight outside ground effect zone or load discharge through use of static air cushion is provided. These configurations have minimum variability (flexibility of application).

For "single-axis" aerodynamic configurations, it is much more difficult to achieve self-stabilization (self-balancing for pitch control) which makes the main problem about configurations of this type. Airplane-type configuration with low-positioned wing and pressure boost, on which WIG craft KM, Orlyonok and Lun' are based (FIG. 65, FIG. 54, FIG. 55), does not provide capability of restoring original balance of moments in relation to center of gravity after impact of occasional disturbance factors, and this means progressing instability of pitch control. In other words, stable flight near to ground effect mode can be only realized by a method where crew should manually counteract external disturbances by way of adjusting WIG craft's balance with elevator deflections either manually or using Automated Control System (ACS).

Next challenge is to ensure safe transition of WIG craft between WIG flight and free flight which entails the need to create flare moment by application of elevator in order to set WIG craft to climb. As the craft leaves ground effect zone, center of pressure shifts forwards which leads to rapid decrease of dive moment due to lifting force with simultaneous uncontained growth of surplus pitch moment, which may result in WIG craft reaching a supercritical angle of attack, loss of speed, airflow breakdown and stall. Application of advanced stabilizer with area comparable to main wing still failed to save some heavy WIG crafts from crash. Therefore, application of airplane-type layout in design of heavy and super-heavy wing-in-ground effect craft was a conceptual error, as R. Alekseyev himself admitted.

Apart from stability issues, with such aerodynamic configuration fuel efficiency advantage of WIG craft over conventional aircraft is considerably reduced because too much fuel is consumed during take-off. Seaworthiness is insufficient. Many years of studies and development in the U.S. resulted in concept design of Pelican super-heavy transport aircraft based on conventional airplane configuration, with ground take-off and landing. The aircraft was designed for long-haul flights in both ground effect mode and at altitudes up to 6,000 meters, U.S. Pat. No. 6,848,650.

Airplane-type aerodynamic configuration of wing-in-ground effect craft has limited variability and is suitable only for limited applications, for example, for type A WIG craft: "Volga-2"—SU Patent 1786768, Aquaglide FIG. 70. Their longitudinal stability is achieved through application of wing design with S-shaped aerofoil (with lower lifting performance) and precise positioning of center of gravity, fine tuning to low ground effect flight height, pulling propellers positioned ahead of the wing with pressure boost under the wing, lower payload, limited engine power and limited seaworthiness.

Airplane-type configuration by A. Lippisch also requires take-off run, is fine-tuned to ground effect flight height, has insufficient stability during transitions and is unsafe during free flight, unsuitable for high speeds, inconvenient in practical use and maintenance and is implemented with low specific loads on the wing. It is not optimum for heavy craft. Amphibiousness is limited and variability is minimum.

It is difficult to meet static and dynamic stability conditions in airplane-type configurations with single wing because distance between the focuses is small compared to length of chord, therefore center of gravity should be precisely positioned within a narrow range. On the other hand, the very notion of "focus in terms of height" is valid only for flight in ground effect conditions. This, together with the need to adjust pitch, complicates piloting during transitions and in case of different disturbances.

There are known guidance materials on piloting wing-in-ground effect craft based on configuration by A. Lippisch that have been derived from computational modeling of WIG craft movement and accidents involving such vehicles [13], which show that it is insufficient to just meet conditions of static and dynamic stability for stabilized flight in order to ensure safety in transient modes.

The "Flying Wing" configuration in the form of known attempted embodiments (including the U.S. Columbia project) is unstable. It is required to either apply automated control and damping systems or limit flight performance or apply substantial stabilizing or additional load-carrying planes, but in this case such configuration becomes very close to "Composite Wing" arrangement.

"Composite Wing" configuration (R. Bartini-VVA-14, MAI-ELA-01, V. Kalganov—"Ivolga-2") features better performance for most parameters, as confirmed by flight tests and by ready for commercial use version of aerodynamic WIG craft EK-12, Russian Patent No. 2099217. Aerodynamic WIG craft of this type show the greatest heights of ground effect flight (in relation to length of the vehicle). For example, flight tests of VVA-14 demonstrated that with mean aerodynamic chord of 10.75 meters the effect of dynamic air cushion started displaying as early as at height of 10-12 meters. This aerodynamic configuration is optimum for different commercial and special applications, i.e. it features maximum variability and flexibility. Since the center wing is of rectangular shape, it is easier to create static air cushion. The configuration is suitable for any flight speed.

However, notwithstanding the fact that high-aspect outer wings do improve longitudinal stabilization, these aerodynamic WIG craft do not have stabilization ability characteristic of "two-axis" configuration, therefore in the case of strong wind disturbance or piloting error they are not completely protected from abrupt pitching and leaving ground effect zone, with loss of speed and control.

Additionally, design under RU Patent 2099217 lacks passenger comfort and ease of maintenance. Pressure boost under the wing to an area exposed at the front causes intense backward air discharge, opposite the flight direction. During steering on water and on ground, coming ashore or afloat in remote areas with wild shore, heavy dusting and splashing occurs in forward hemisphere. In addition to lower visibility, this causes mechanical damage to structure surfaces by sand and pebbles, thus necessitating additional protection for engine air filters. In cold climate, dry fresh snow may be lifted in the air to lower visibility down to several meters, which renders safe movement over ground impossible. As to pressure boost under the wing, impulse from propulsive units with shrouded propellers is used irrationally and detrimental pressure rise is caused on the upper leading edge of the wing due to air stream directed to surface at wide angles. This necessitates application of sophisticated high-lift devices on wing leading edge, which makes the structure too complex and heavy. Intense discharge of air from under the wing in backward direction prevents creation of high-pressure air cushion. Even with pressure boost provisions this configuration still requires take-off run and landing roll.

Aerodynamic WIG craft ELA-01 is free from this disadvantage as its static air cushion enables it to take off from standstill position with following acceleration to cruise speed.

Vertical take-off amphibious craft VVA-14 was initially designed to use pressure boost under center wing with 12 tilted turbojet engines.

Tests of vertical take-off capability on special gas-dynamic stand with six turbojet engines confirmed viability of this design.

Based on cumulative evidence, the nearest analogue is engineering solution under RU Patent 2254250 C2 B 60 V 1/08.

DISCLOSURE OF THE INVENTION

The object of the present group of inventions is the creation of self-stabilized aerial vehicles and other vehicles in all weight classes that would offer greater flight and maneuvering safety, increased load-carrying ability and flying height in ground effect mode, reduced size, improved take-off and landing performance, amphibious performance and efficiency, expanded performances and operating range of center of gravity location, greater ease of use and maintenance.

The above-mentioned results are achieved by simultaneous application of the methods for generating a system of aerodynamic forces, the structural solutions and safe piloting methods conceptually related with those proposed in the present group of inventions to "flying wing" or "composite wing" aerodynamic configurations.

The issue of full longitudinal stability is resolved by imparting intrinsic stabilization properties that are characteristic of the "double-axis" aerodynamic configurations to center wing section (low-aspect aerofoil), i.e. through generation of at least two lift forces mutually balanced in relation to center of gravity, and also through altering conditions of center wing interaction with free approach stream and supporting surface. For this purpose, within the limits of horizontally continuous projection, center wing with wing-end aerodynamic plate-floats (APF), local zones of lift force generation are created. The local zones are created by use of relevant number of low-aspect-ratio wings (LAW), of which center wing with specified dimensions is composed. The LAWs are arranged along longitudinal axis with overlap in horizontal plane and in symmetry about diametral plane. The forward LAW(s) is fitted with leading edge flap and flaperons. The rear LAW(s) is fitted with flaperons. On leading edges of the second and subsequent LAWs (second and subsequent LAW groups) propulsive units with shrouded-screw propulsors (SSP) are mounted, leading edges of the LAWs being located in the plane of SSP exits or so as to smoothly adjoin internal surface of the SSP rings. Additionally, leading edges of the rear LAW are arranged above leading edges of flaperons of the LAW ahead. Thus, air ducts are formed between lower surfaces of the rear LAW and upper surfaces of the flaperons, through which lower portion(s) of the slipstream (jet) from SSP is directed to under the center wing. SSPs are mounted with setting angles that are equal or close to setting angles of the planes on which they are mounted. This measure allows for laminar (streamline) flow over the surfaces beyond them and provides vertical component of the propulsive force. The lower half of the SSP internal surface smoothly adjoin upper surface of the front LAW and vertical walls of APFs, thereby creating a semi-annular section of LAW which smoothly unfolds into upper surface of the front LAW with rectilinear generator. As a result, front LAW, SSP with engine and rear LAW altogether form a single structural base group, that is a propulsive system, which, together with APFs and additional low aspect ratio wings, forms the propulsive carrying system of the WIG craft.

The said structural group makes the basis for all possible versions of vehicles to be created proceeding from the present group of inventions. Addition of vertical stabilizers, rudders and elevators results in a structure which is necessary and sufficient for creation of wing-in-ground effect craft of the type A. Addition to type A WIG craft of high-aspect-ratio wings, outer wings fitted with ailerons and high-lift devices that are mounted on wing-end surfaces of additional low-aspect-ratio wings, brings about the propulsive carrying system of wing-in-ground effect craft of the types B and C. In this conjuncture, WIG craft identification with a particular type is determined by span and area of outer wings, and by technical regulations and standards applied during construction and certification phases.

The said structural base group provides for generation of three different air cushions under it: within the limits of its projection onto horizontal plane—Static Air Cushion (SAC); under the upper LAW—Dynamic Air Cushion (DAC); and under the rear LAW—Static-and-Dynamic Air Cushion (SDAC).

In cruise operating mode, a region of low air pressure with reduced longitudinal irregularity is formed above the entire propulsive lifting structure. Side enclosures of air cushions are internal surfaces of APFs (or side surfaces of fuselage and APFs). Leading-edge flap of forward LAW acts as forward enclosure of the static air cushion, and its flaperons act as rear enclosure of the dynamic air cushion and forward enclosure of the static-and-dynamic air cushion. Flaperons of the rear LAW(s) act as rear enclosure of the static air cushion(s)

during take-off, taxiing and landing, and during level flight those flaperons act as rear enclosure of the static-and-dynamic air cushion(s). At the same time, a distance between actual focuses in terms of height and in terms of angle of attack is intrinsically ensured to be notably greater than similar distances between focuses of continuous center wing having equivalent geometrical dimensions. This helps meet conditions for achievement of intrinsic static and dynamic stability and expands the range of permissible weight and balance settings which leads to increase in flight safety level and transportation capabilities.

Execution of center wing in the form of said structural base group, or in the form of combination of such groups, will provide different conditions of lift force development and different nature of interaction between the front and the rear portions of center wing and water or ground surface.

Kinetic energy of free approach stream is handled by the front LAW under which dynamic air cushion develops; the rear airfoil is blown over its entire span by the propulsion unit which, due to air pressure boost, generates an area of high static pressure, a static air cushion, under it, with air discharge over the flaperon trailing edge which is supported by air layer already compressed by the forward aerofoil. Thus, in terms of lift force development, the rear part of WIG craft is supported in fight by static and dynamic air cushions or, which is quite similar, by single static-and-dynamic air cushion.

Another version of realization of flight with relevant engine power is the method whereby slipstreams (jets) from propulsion units, due to Coanda effect, would generate jet flaps which, due to an increase in effective length of LAW chords, curvature of profiles thereof and forces of slipstreams (jets) from propulsion units, would increase load-carrying ability of composite center wing without any considerable increase in drag. This corresponds to structural increase in chord of equivalent wing and would lead to an increase in height of ground effect flight, i.e. to improvement of seaworthiness and safety performance, or otherwise will allow running engines at lower thrust while retaining current height that means efficiency improvement.

Furthermore, suction of air mass with the shrouded-screw propulsor over the span of the forward partially semi-annular LAW drastically changes both the form of length-wise distribution of depression regions and its magnitude as compared to similar characteristics of a conventional wing configuration of similar span with free approach air flow around it. As mentioned above, research by Central Aerohydrodynamics Institute (TsAGI) [26] has proven the gain in thrust of up to 30% is achieved through use annular center wing, with the same effect for semi-annular center wing. In line with these recommendations, in the group of inventions proposed here annular surface of SSP smoothly adjoins semi-annular part of the forward LAW and further towards nose smoothly unfolds into upper surface of the forward LAW. In presence of side vertical enclosures (APFs and fuselage) this provides extension of semi-annular part and increase in suction effect over the forward LAW. Combined with vertical component of thrust increment due to the annular part of the forward LAW, the portion of total lift that emerges on its upper surface is increasing.

This arrangement of flow around LAW of composite center wing ensures different conditions of interaction between its forward and rear parts with approach air flow and with water or ground surface. This way, the task of reducing "detrimental" and enhancing "advantageous" components in the dynamic system "air stream—wing—support surface" is fulfilled.

Using this method of generation of lift forces, it will be possible to design aerial vehicles featuring high level of flight safety and offering numerous versions of embodiment which will be suitable for a particular application to the highest extent, and would have various distinctive features including:

Higher safety of flying and maneuvering;

Improved distribution of mass of the craft within horizontal plane projection;

Higher rigidity of structure which represents polygon of forces for all the three axes, which enables weight reduction in dead weight of structure;

Wider range of operational weight and balance settings due to wider range of possible longitudinal balance settings;

Absence of balance losses that are intrinsic in conventional airplane configurations;

Improvement of moment characteristics relative to lateral axis due to positioning of engines with propellers close to center of gravity in both longitudinal direction and in terms of height, and absence of stabilizer that is positioned high and far to the rear, boost or thrust propulsion units that are positioned far to the front;

Increased load-carrying ability;

Extended functionality;

Higher maneuverability;

Absence of dusting and splashing in forward hemisphere.

In case of multi-engine configuration, moments of thrust forces of propulsion units of the front group and rear groups (and vertical components thereof) are cancelled out (mutually compensated) completely or partially. Since the propulsion units have setting angles, lines of thrust force vectors lie above and below of the center of gravity. That is, simultaneous selection of higher or lower thrust setting for all engines would have minimal effect on balance of WIG craft. Such arrangement of propulsion units increases load-carrying ability of center wing and vertical maneuverability (acceleration performance) of WIG craft. Thrust performance is improved, as mentioned above, due to application of semi-annular LAWs (Bartini effect) and through gradual increase (multiplication) of velocity of air flow passing through the propulsion units.

Distinctive feature of aerial vehicles based on the group of inventions proposed here is, as already mentioned, the increased length of chord of equivalent aerofoil by means of which ground effect is realized. This is a result of maximum utilization of dimensional length of the aerial vehicle (fuselage) and effects from jet flaps. This feature considerably increases effective height of flying in ground effect mode as compared to WIG craft of the same length that are based on other aerodynamic configurations. Furthermore, the center wing composed of relatively thin LAWs positioned within the slipstreams from propulsion units, which take in the layer of air from the upper surface and direct it to under the lower surface at oblique angle, creates differential pressure that exceeds similar value shown by a wing with similar dimensions and greater relative thickness of aerofoil, shape of which is close to line of approximation running from the leading edge of aerofoil of forward LAW to the point located beyond the trailing edge of the rear LAW—on the underside through leading edges of LAW flaperons and on the upper side through upper halves of SSP. At the same time, composite center wing features considerably lower drag because, first, total actual area of master cross-section of LAW and propulsion units is less than master cross-section of equivalent continuous wing; second, in composite center wing only the front LAW interacts with free approach air flow; and, third, effects from propulsion units lead to a different nature of flow around and lower airfoil and induced drags as compared to equivalent continuous wing.

While the effort of center wing in air flow may be considered to be the passive way of generating lift force, the effort of composite center wing with the proposed blowing method represents the active way of lift force generation with improved aerodynamic results.

To ensure amphibiousness and all-surface take-off and landing capability, a special take-off and landing unit is implemented in all WIG craft based on the group of inventions—high-pressure static air cushion (SAC) with maximum dimensions possible in this configuration. Availability of landing gear on larger air cushion allows for considerable decrease in specific load on air cushion. This results in decrease in required value of positive pressure in SAC and, accordingly, in required engine power during take-off, which improves fuel-efficiency during take-off and movement on air cushion. Landing gear on air cushion with greater area improves take-off and landing performance and increases overall flight safety level. Particularly, safety increases for both normal landings on any flat ground surface or water and for emergency landings in case of an in-flight contingency.

Technical and economic efficiencies of SAC are ensured through possibility to use up to full power of thrust propulsion units for static air discharge, absence of any additional engines and fans, absence of movable shutters, deflectors, flaps and piping for deflection of jet streams, absence of any device for tilting propulsion units or engines (except for realization of vertical take-off and landing), full utilization of impulse from jet streams of propulsion units for boosting positive pressure in SAC cavity, while engines and propulsion units stay in fixed position.

As mentioned above, setting angles of propulsion units allow for development of vertical components of thrust force that are summed up with aerostatic and aerodynamic lift forces. This facilitates the start and movement on SAC, and also improves stability and handling in these operating modes.

Additional all-moving tail plane (stabilator), made to the span of the rear (last) LAW and mounted above its elevons with possibility of upper portion of SSP slipstream flow around it, ensures additional lift force and controllability, aerodynamic deceleration and reversing.

In addition to measures to ensure intrinsic longitudinal static and dynamic stability, full damping of pitch fluctuations is provided through controlling magnitudes of front and rear lift forces: front—as a function of pitch angle in the form of strong reversed feedback, and rear—in the form of positive feedback. Control of magnitudes of forward and rear lift forces is implemented by way of automated dynamic control of deflection angle of flaperons of forward and rear LAWs, accordingly. As such control may be implemented using a common mechanical "push-pull" linkage connecting the existing structural elements—elevators and LAW flaperons, i.e. without use of any sophisticated system of automated control and damping (ACS and ADS), —this solution may be considered as another element of the intrinsic stabilization and damping feature. At the same time, system for automated dynamic control of flaperon positions may be also implemented using known ACS elements.

Functionality extension, i.e. broadening the spectrum of tasks to be fulfilled by family of aerial vehicles based on the present group of inventions, is ensured through both availability of take-off and landing system on static air cushion and high operating performance, on one hand, and a number of possible versions of specific applications based on the baseline concept, on the other. Because technically the baseline concept in implemented in the form of structural base group, it can serve basis for manufacture of a number of uniform modules on the basis of which modules WIG craft may be designed that will fulfill a broad spectrum of practical tasks through different spatial and quantitative configurations. Types of aerodynamic LAW aerofoils, relative thickness thereof, and setting angles of LAWs and SSPs depend on the application for which WIG craft is designed. For heavily loaded and slow craft increased aerofoil thicknesses, greater setting angles and larger SSP diameters shall be used. Additionally, application is broadened through quasi-vertical and vertical take-off and landing capability implemented in WIG craft based on the engineering solutions proposed here. To the point, quasi-vertical take-off and landing are enabled without any substantial change in baseline versions, and vertical take-off and landing capability will require increased SSP diameters, higher engine power and possibility of LAW (or any part thereof) movement, with propulsion units, about their lateral axes into vertical position. Efficiency, performance and safety of hovering mode as compared to helicopters are substantially increased due to absence of sophisticated and heavy main propulsion reduction gear and transmission to tail rotor, and absence of rotating blades far beyond overall dimensions of the fuselage, due to use of four or more propulsion units for generating vertical thrust, and also due to large area of horizontal load-carrying aerofoils under which high air pressure areas are formed. Furthermore, such WIG craft would have considerably longer horizontal flight range, higher speed and better efficiency. Variability of this group of inventions allows for designing vehicles for fulfillment of tasks that presently can be fulfilled only by conventional vessels.

Another factor that directly affects flight safety and application of WIG craft is the method of flying the vehicle. Virtually all WIG crafts built so far use the same method of flying as airplanes, which essentially includes horizontal take-off run distance, change of pitch angle to gain necessary lift during all phases of the flight and during maneuvering, and landing roll. In contrast, the key difference of the method proposed here is that all elements and phases of the flight are operated at heights below minimum safe altitudes (or at heights designated for WIG craft flight operations—up to 150 meters above sea surface) with constant zero pitch angle. Safety increases firstly due to simplified piloting technique during critical phases of the flight i.e. landing, maneuvering during ground effect flight and transitions. Thus, emotional pressure on pilot is decreased, and this alone is facilitating factor. On the other hand, stabilized horizontal attitude of wing-in-ground effect craft in ground effect or near-to-ground-effect flight that corresponds to landing attitude considerably eases operations required of the crew for both normal and emergency landing when counteracting impacts from external disturbances and consequences of piloting errors. Although, with such a method of flying, the very possibility of crew error is reduced. Constant horizontal attitude of fuselage improves level of comfort for passengers and crew on long-haul fights, and also helps increase flight safety when transporting a cargo. The method of realizing the flight with constant pitch angle is conceptually related with methods of formation of a system of aerodynamic forces that are proposed for the present group of inventions, and structural designs for implementation of those methods. That is, aerodynamic configurations and specific designs of wing-in-ground effect craft are such that no pitch variation is required for flying throughout its duration, from take-off to landing.

Ease of use and higher maintainability are achieved due to possibility of arranging such entrances and cargo doors that would provide convenient and safe routes and methods of embarkation and disembarkation of passengers and loading/offloading of cargoes both on ground and "afloat". Possible configurations enable WIG craft designs with rectilinear side fender bar in mooring configuration, making it possible to moor up to existing port facilities or conventional vessels.

Maintainability is ensured through absence of high-positioned engines, units and filler necks that require access on a daily basis; maintenance works may be performed without any specialized equipment (stepladders, ancillary floating facilities, etc.), both on ground and afloat. For super-heavy WIG craft, access to engines may be provided through wing.

For qualitative evaluation of flight and stabilization capabilities of WIG craft based on the present group of inventions, a free-flying model of WIG craft was constructed and tested. Center wing of the model is composed of three LAWs with covering (overlap) in horizontal plane. The forward LAW is fitted with free-suspended flap, which is linked to spindle of nose elevator (elevon)—acting as angle of attack sensor—by means of a rod and rockers, halves of the elevon being free suspended in leading edges of additional LAWs. The model is fitted with swept outer wings. For longitudinal balancing (trim), the rear LAW provides for possibility of adjusting setting angle and changing deflection angle of flap, which is left in fixed position after adjustment. Since the model is free-flying (unpowered), there is only one optimum flight speed, only one optimum weight and balance configuration, and only one optimum angle between the planes of flap of the forward LAW and nose elevon, which would ensure best flying performance. Center wing of the model has length of equivalent chord 310 mm. Balance—37% by MAC of center wing.

In case of horizontal start from the floor surface using rubber strip catapult, the model (without pitch increase) climbs to 300-500 mm, stably flies over certain distance at one stable height and then, in line with loss of speed, gradually descends (without a change of pitch angle) and touches down in horizontal configuration. There is no pitching-up characteristic of conventional airplane-type designs in case of wrong weight and balance or when optimum start speed is exceeded. At the same time, ground effect sector of the flight can be seen clearly, height of which exceeds center wing chord in all cases.

In case of flight at a height 2-3 times greater than CW chord, and when flying over the boundary of step-up elevation of support surface which decreases effective flying height, step-wise increase of pitch angle is observed that confirms considerable ground effect for this layout at heights exceeding length of chord of composite center wing.

Effects from angle between planes of the forward LAW flap and nose elevon are clear. When the angle decreases, flight height decreases too, and at wider angle flight height increases. Complete damping of pitch control (longitudinal balance) fluctuations is confirmed. Total distance covered by the model (including roll of 2-3 meters) from the start to the complete stop is 25-30 meters, i.e. by two orders of magnitude greater than the flight height.

Workability of the proposed method of aerodynamic force generation and of the self-stabilization system devices has been completely confirmed through a series of flight tests of several versions of aerodynamic configuration with a twin-engine radio-controlled model.

BRIEF DESCRIPTION OF THE DRAWINGS

The invention claimed here is explained with drawings of some of the versions of preferred embodiment.

FIG. 7—Type A light multi-purpose WIG craft. Windows are shown on FIG. 9(a-c).

FIG. 8—Light multi-purpose WIG craft. Types B and C.

FIG. 9—Patrol WIG craft, type A. Fairing of tyres is not shown.

FIG. 10—Light or medium transport WIG craft. Types B and C.

FIG. 11 (b)—WIG craft acc. to FIG. 7. Top view.
FIG. 11 (c)—WIG craft acc. to FIG. 7. Front view, scaled-up.
FIG. 12 (b)—WIG craft acc. to FIG. 8. Top view.
FIG. 12 (c)—WIG craft acc. to FIG. 8. Front view.
FIG. 13 (a)—WIG craft acc. to FIG. 9. Side view.
FIG. 13 (b)—WIG craft acc. to FIG. 9. Top view.
FIG. 13 (c)—WIG craft acc. to FIG. 9. Front view.
FIG. 16 (b)—WIG craft acc. to FIG. 10. Top view.
FIG. 16 (c)—WIG craft acc. to FIG. 10. Front view.
FIG. 16 (d)—WIG craft acc. to FIG. 10. Main view.
FIG. 16 (e)—WIG craft acc. to FIG. 10. Main bottom view.
FIG. 24 (b)—WIG craft acc. to FIG. 22. Top view.
FIG. 24 (c)—WIG craft acc. to FIG. 22. Front view.
FIG. 28 (b)—WIG craft acc. to FIG. 27. Top view.
FIG. 28 (c)—WIG craft acc. to FIG. 27. Front view.

FIG. 28 (d)—WIG craft acc. to FIG. 27. Bottom view. Approximate shape and boundary of DAC.

FIG. 33 (b)—Model acc. to FIG. 31. Top view.

FIG. 33 (c)—Model acc. to FIG. 31. Front view.

DESCRIPTION OF EMBODIMENT VERSION

Figure 1:
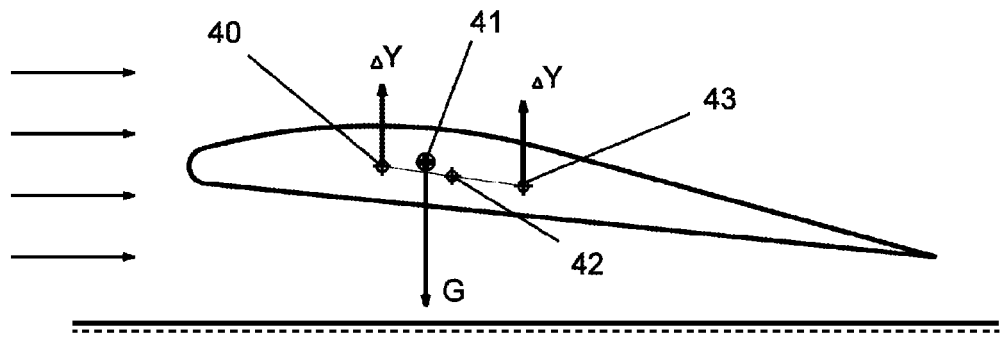
FIG. 1—Mutual arrangement of the center of gravity, focus in terms of height and focus in terms of angle of attack that ensures intrinsic static and dynamic stability.
Figure 2:
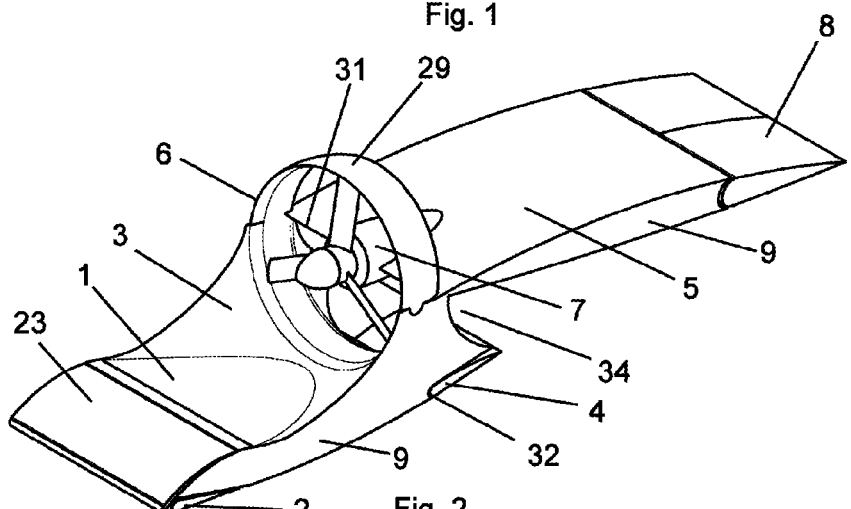
FIG. 2—Structural Base Group (SBG). Main view.
Figure 3:
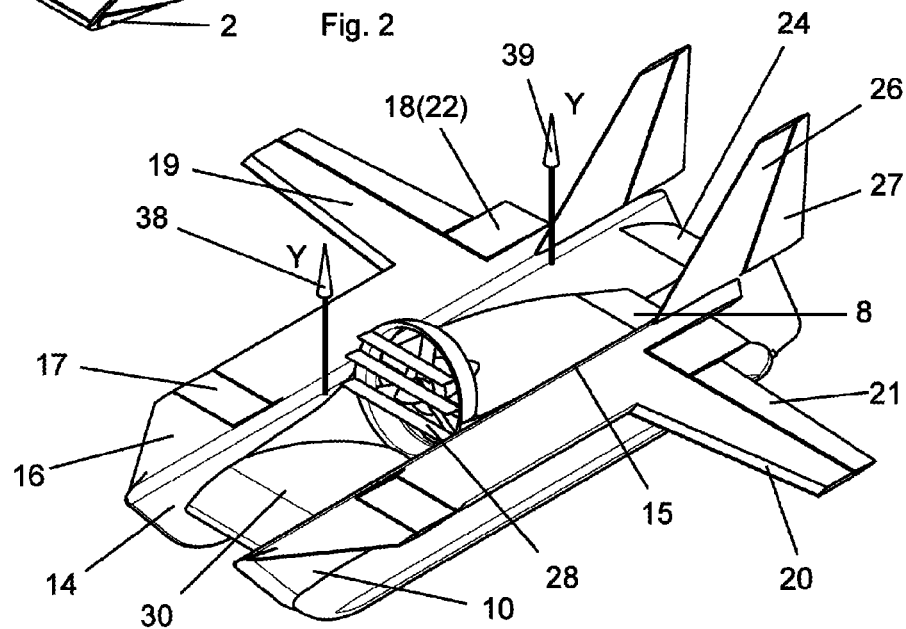
FIG. 3—Propulsive Carrying System (PCS) of WIG craft. Main view.
Figure 4:
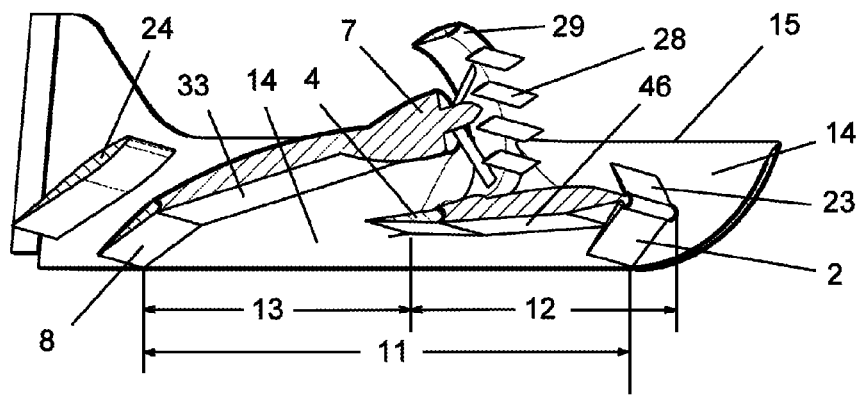
FIG. 4—Propulsive system (PS). Diametral plane section. Wing high-lift devices in the position for generation of static air cushion. Main view.

As mentioned above, the group of inventions proposed here makes it possible to create aircraft having different functional possibilities, in different weight categories—from super-light to super-heavy, with a great number of various structural embodiment versions. Therefore, the designs in which the uniform baseline concept is embodied and which comprise elements that are intrinsic to WIG craft based on this group of inventions will be described here first.

The propulsive carrying system of WIG craft comprises two low aspect ratio wings (LAWs)—the forward LAW 1 with leading edge flap 2, semi-annular section 3 of the upper surface and flaperons 4, and the rear LAW 5 with shrouded-screw propulsor (SSP) propulsion unit 6, engine 7 and flaperons 8. Wing-end surfaces of LAW 9 are joined with aerodynamic wing-end aerodynamic plate-floats (APF) 10. Setting angle of the forward LAW 1 is equal to mean optimum angle of attack of the aerofoil applied for the design range of cruise heights and speeds of flight in ground effect mode, subject to the effects of suction of flow and boundary layer from its upper surface. Setting angle of the rear LAW 5 may be less than, equal to or greater than the setting angle of the forward LAW 1, and is determined by requirements to performance of a specific WIG craft. At the same time, under the LAW there are cavities for static (SAC) 11, dynamic (DAC) 12 and static-and-dynamic (SDAC) 13 air cushions (AC).

Internal surfaces 14 of APFs 10 serve as side enclosure walls of the air cushions. While WIG craft moves in static AC mode, its enclosure wall at the front side is nose flap 2, and from the back side it is enclosed by flaperons 8 of the rear LAW 5. In flight, flaperons 4 of the forward LAW 1 perform function of rear enclosure wall of the dynamic AC and, at the same time, of the front enclosure wall of the static-and-dynamic AC, while flaperons 8 of the rear LAW 5 serve as rear enclosure walls if the static-and-dynamic air cushion. Leading edges of flaperons 4 and 8 in neutral position, which corresponds to the design flight mode, may lie in the same or in different horizontal planes. Their mutual alignment depends on the type of wing-in-ground effect craft, its application, specific load on the load-bearing plane, general arrangement including proportions of the elements comprising propulsive carrying system, and number of the base structural groups used along the longitudinal axis.

On the upper edges 15 of the wing-end aerodynamic plate-floats 10, additional low aspect ratio wings (ALAW) 16 are mounted. The leading edges of the ALAWs 16 include nose elevators (elevons) 17, and the trailing edges thereof include tail elevators (elevons) 18. The tail elevators 18 may act as elevons of high-aspect ratio aerofoils—outer wings 19—that are mounted on the side edge surfaces of ALAA trailing edges 16. The outer wings are provided with slats (leading edge flaps) 20, ailerons 21 and elevons 22. Outer wings 19 are arranged so that the projection of resultant center of pressure of the outer wings 19 and ALAW 16 on the longitudinal axis lies between the center of gravity and trailing edge of the rear ALAW 5. This improves static longitudinal stability because the focus in terms of angle of attack of the whole load-bearing structure of WIG craft is shifted towards the rear. Alongside with this, the range of admissible center of gravity locations is extended.

On the upper surfaces of LAWs, starting from the leading-edge part of the forward LAW 1, one or more spoilers are arranged 23. The spoilers 23, when blown with intake or exhaust slipstreams (jets) of SSPs 6, provide additional lift forces at low ground speeds—during take-off, taxiing, climb at a large angle, and during hovering operation.

Above flaperons of the rear LAW 5, with a shift towards the tail, stabilator (all-moving tailplane) 24 of center wing 25 is mounted. The stabilator 24 enables an increment of lift force during all phases of flight. During taxiing on static air cushion the stabilator 24 provides initial longitudinal balance (maintains horizontal attitude of fuselage) and allows for the control of ground speed level, and during landing it may serve as brake flap or operating element of reverser.

Two-fin vertical tail 26 with rudders 27 is mounted on tail ends of APFs 10.

In front of SSP 6, within boundaries of its ring, horizontal thrust vector control planes 28 are mounted which have aerofoil section. The surfaces 28 are swing-mounted in the form of a grid, so that trailing edges thereof lie in a plane that is parallel to the plane of the leading edge of ring 29 of SSP 6.

The need for application of the spoilers 23, the stabilator 24 and the thrust vector control planes 28 depends on specific application of WIG craft, the degree of its loading and conditions of its operation. For example, low loaded high-speed WIG craft with high available power may be operated without application of the spoilers.

The lower half of the SSP internal surface 29 is smoothly adjoined to upper surface 30 of the front LAW 1 and with internal surface 14 of APF 10, thereby creating a semi-annular section 3 of LAW 1 which smoothly unfolds forwards into upper surface 30 of the front LAW 1 with rectilinear generator. The lower half of rear edge of the ring 29 is smoothly adjoined to internal surface 14 of APF 10 in the "tailward" direction so that upwards deflection of elevons 4 from their neutral position is provided.

Proportion of diameter of the inlet side of ring 29 and span of upper surface 30 of the forward LAW 1 may be less than, greater than or equal to 1 (one). Proportion of diameter of the outlet side of ring 29 and length of the adjoining leading edge 31 of the rear LAW 5 may be less than, greater than or equal to 1 (one). These proportions depend on general arrangement and on structural solutions that meet requirements to performance of a particular WIG craft to the maximum extent. Leading edge 31 of the rear LAW 5 may be arranged either in the plane of outlet side of the ring 29, or inside the ring. Such arrangement is determined by the objective of achieving best performance of a particular SSP in all modes. Leading edge of the rear LAW 5 is sharp. Leading edges 32 of flaperons 4 of the forward LAW 1 are arranged in the plane of outlet side of the ring 29. Upper surface of flaperons 4 with the flaperons in neutral position is tangentially adjoined to the generator of internal surface of the ring 29, lying in diametral plane. Between the lower surface 33 of the rear LAW 5 and upper surfaces of flaperons 4 air duct 34 is arranged through which lower portion of slipstream (jet) 35 of SSP 6 is directed to under the center wing. SSP 6 is mounted with setting angle equal or proximate to setting angle of the rear LAW 5 which ensures best streamline of its surface.

On the upper surface 30 and under spoiler 23 inlet orifices (or slots) of boundary layer ejection system (not shown on drawing) are provided, with outlet orifices (or slots) thereof provided on the inner surface of the ring 29.

For wing-in-ground effect craft as per this group of inventions, it is possible to create several versions of additional system for automated stabilization and damping of pitch fluctuations (ADS). Generally, it comprises angle of attack sensor (AAS), control signal exchange channel, actuating mechanism(s) and operating element(s), which in this case are LAW flaperons. The difference here is that elevators free-castoring in the stream (i.e. with unbound control rod) may serve as angle of attack sensors: either forward or rear or both forward and rear at the same time.

Design of the system may be either fully mechanical or combined, using electrical or hydraulic or optical elements.

FIGS. 34-37 show overview and operating principle of fully mechanical version of automatic stabilization and damping system which is applicable mostly to light aerial vehicles. The system comprises angle of attack sensors (AAS)—which are at the same time elevators 17 and 18,— which simultaneously serve as both actuating mechanism and power drive, control signal transmission channel in the form of push-pull control linkage 36 and operating elements which are flaperons 4 and 5 of forward and rear LAWs.

Control systems of flaperons 4 and 5 are designed to provide possibility of controlling angle 37 between the planes of neutral (in terms of roll) positions of flaperons and the planes of neutral positions of AAS (i.e., elevators 17 and 18). Control of the angle 37 is effected by way of variation of setting angle of LAW flaperons neutral positions and fixation of new angle value 37, for example, in case of electrical remote control system. If elevators 17 and 18 and LAW flaperons 4 and 5 are connected to each other with push-pull control linkage, control action will be effected by changing the length of the push-pull control linkage. Channel for transmission of control signal (push-pull control linkage) has a mechanism for disengagement (disconnection) of AAS and flaperons (not shown on drawing).

Figure 34:
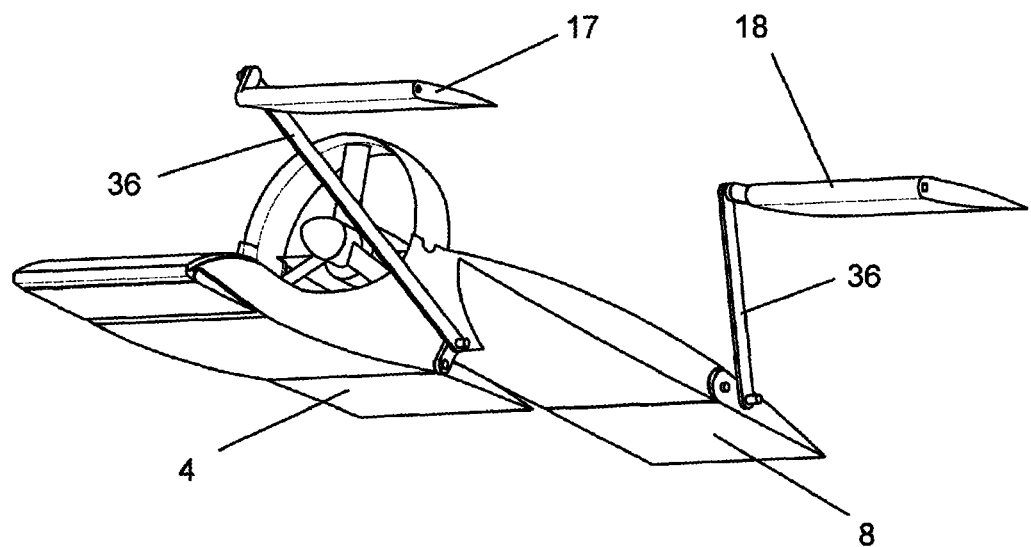
FIG. 34—Mechanical drive of self-stabilization and damping system. Schematic diagram. General arrangement of LH side propulsion system.

Elevator 17 may be designed as two elevons, and in this case each elevon of the elevator, when acting as AAS, may have individual connection to corresponding flaperon 4 of LAW (FIG. 34). One of the versions of lateral control of LAW flaperons 4 may be implemented in this way.

In line with control inputs from AAS (forward elevator 17), flaperons 4 of the forward LAW deflect to the same side as AAS. This enables control of the magnitude of forward lift force 38 as a function of pitch angle in the form of strong reversed feedback.

In line with control inputs from AAS (aft elevator 18), flaperons 5 of the rear LAW deflect to the opposite side. This enables control of the magnitude of rear lift force 39 as a function of pitch angle in the form of positive feedback.

Other versions of linkage are also possible in an elementary system for self-stabilization and damping of pitch control fluctuations, for example:

a) AAS—forward elevator and operating element—rear flaperons;

b) AAS—rear elevator and operating element—forward flaperons;

c) AAS—forward elevator and operating element—stabilator (all-moving tail plane) of center wing 24;

d) version under c) above plus dynamic control of rear flaperons with inputs from autopilot, etc.

Figure 35:
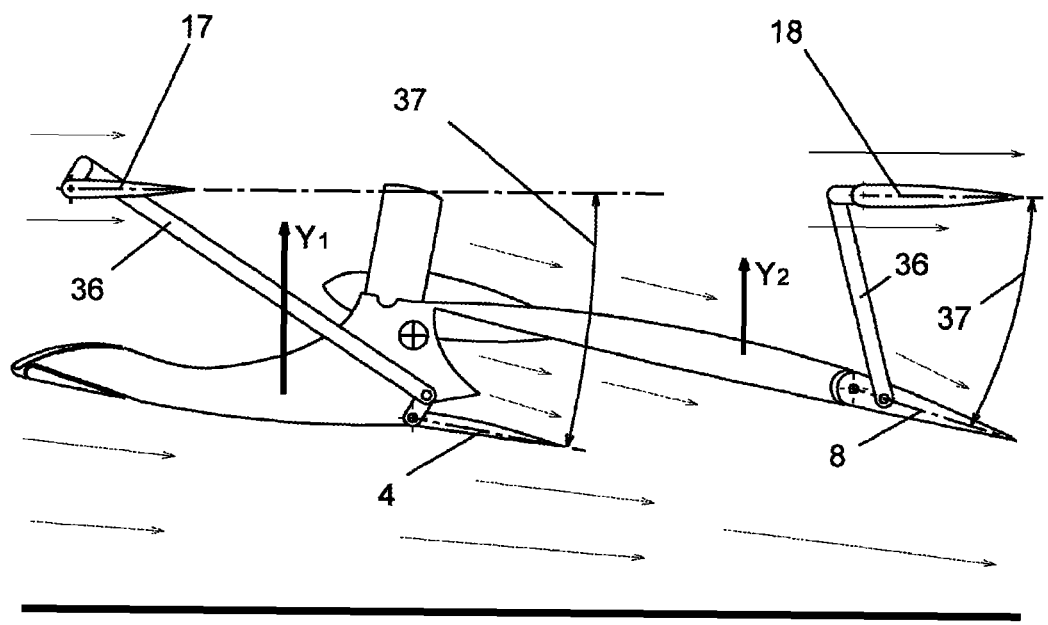
FIG. 35—Streamline arrangement in stabilized flight.

FIG. 35—Streamline arrangement in stabilized flight. Elevators 17 and 18 (AAS) are set in line with the flow. After balancing, angle 37 is set in control system. The system is stabilized.

Figure 36:
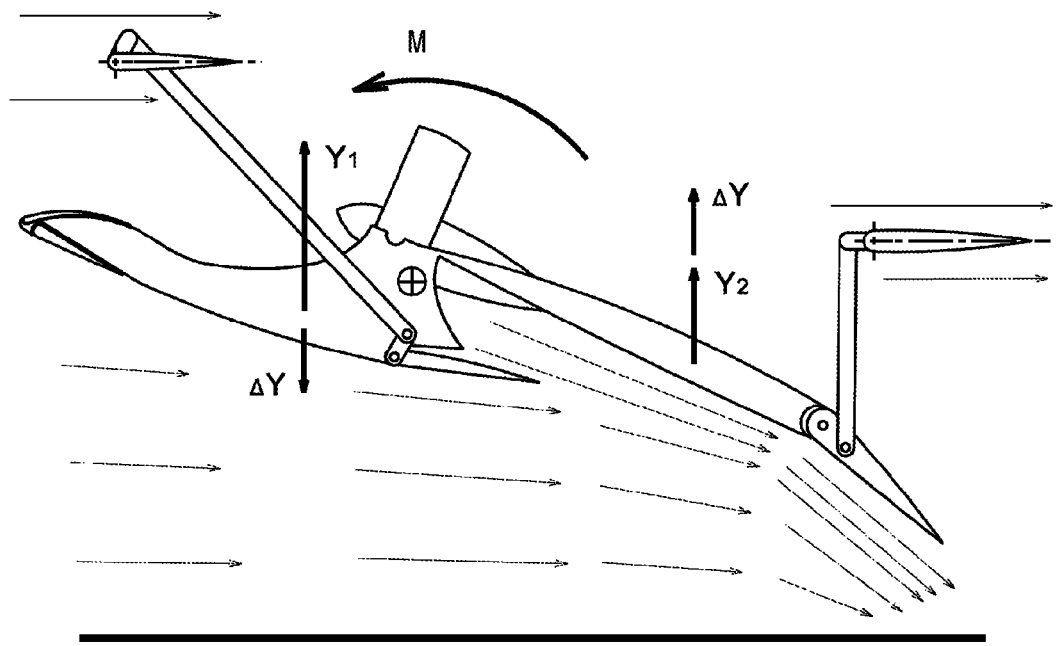
FIG. 36—Operation of self-stabilization system at increased pitch angle.

On FIG. 36—Pitch-up—angle of attack of elevators becomes positive. Velocity head increases pressure on the lower surfaces of elevators 17 and 18. This pressure causes the elevators to rotate about their axes, and elevators are set in line with the flow again. With rod and rockers, nose elevator 17 deflects flaperons 4 upwards, and tail elevator 18 deflects flaperons 8 downwards. Increments of lift force ΔY that emerge on LAW during this operation create negative pitching moment M which restores the disturbed balance.

Figure 37:
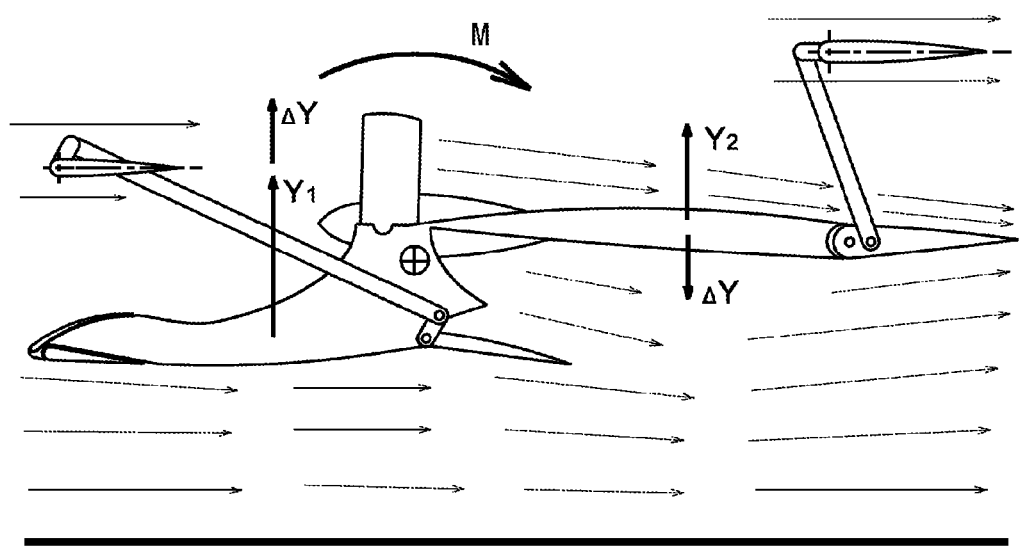
FIG. 37—Operation of self-stabilization system at decreased pitch angle.

On FIG. 37—Negative pitching—the action mechanism is the same as on FIG. 36, but direction is reversed. Angle of attack of elevators 17 and 18 changes to negative and pressure rises on their upper surfaces. As elevators 17 and 18 are set in line with the flow again, they deflect flaperons 4 downwards, and flaperons 8—upwards. On LAWs increments of lift forces ΔY develop creating pitch-up moment M, which brings the system to initial state.

FIG. 1 shows the condition for achievement of intrinsic static and dynamic stability of WIG craft under which focus in terms of height 40 must be located ahead of center of gravity 41, the center of gravity 41 being located between focus in terms of height 40 and the point 42 of midway between the focus in terms of height 40 and the focus in terms of angle of attack 43.

Figure 5:
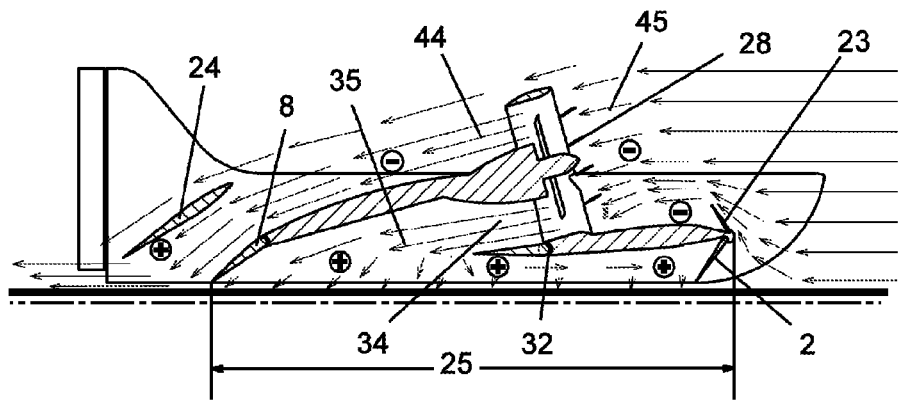
FIG. 5—PS streamline arrangement in static air cushion operating mode.

Operation of propulsive carrying system in static air cushion mode is shown on FIG. 5. For take-off and movement on static air cushion to be performed, leading-edge flap 2 and flaperons 8 of the rear LAW are deflected to the lowermost position where their trailing edges rest on ground (water) surface, forming closed enclosure of static air cushion together internal surfaces 14 of APFs. Spoiler 23 and thrust vector control planes 28 are deflected to angles that ensure maximum lift force increment. The stabilator (all-moving tailplane) 24 of center wing is set to a position that ensures longitudinal balance (horizontal attitude of fuselage) for design balance configuration in SAC mode. Flaperons 4 of forward LAW are set to neutral position or deflected upwards until their horizontal surfaces are in horizontal position. The engine is set to take-off thrust, and take-off and acceleration are performed on static air cushion. Slipstream 35 of the lower half of SSP 6 creates differential static pressure in static air cushion cavity. Slipstream 44 of upper half of SSP 6 creates a region of depression above rear LAW, and with flow around the stabilator 24 aerodynamic force is created, magnitude and direction of which are set in accordance with the selected center of gravity configuration and take-off conditions.

Air stream 45 over the front LAW 1 that is inhausted by SSP 6 creates additional lift force due to increased effective curvature of the upper aerofoil section and relative thickness of aerofoil of the front LAW which are ensured by spoiler 23.

Additional lift force is created due to depression on the upper surface 30 which emerges due to boundary-layer suction by the system for boundary layer ejection onto internal surface of the ring 29.

Additional lift force emerges on thrust vector control planes 28 which are blown with sucked stream 45 at angle of attack corresponding to angle of maximum lift force of their aerofoils. This lift force is created by direct effort of SSP and is applied to its elements, therefore it adds together with vertical component of thrust force Pv, which leads to deflection of resultant vector of thrust force P upwards.

In the course of WIG craft acceleration, leading-edge flap 2 and spoiler 23 are smoothly retracted at rate proportional to increase in speed, and flaperons 8 of the rear LAW and surfaces 28 are set to position for ground effect flight or further climb. In the course of stabilized movement on static air cushion flaperons 4 of the forward LAW and stabilator 24 are set to position for the specified ground effect flight or climb height. Since setting angles of LAWs 1 and 5 and SSP 6 are wide enough, there is no need for increasing pitch angle in order to gain altitude. Therefore, climb is performed with horizontal attitude of fuselage. Necessary lift force is achieved with relevant angles of LAW flaperons deflection and engine power setting. Elevators are used to keep fuselage horizontal. Longitudinal balance is provided with both differentiated deflection of flaperons 8 and stabilator (all-moving tail plane) 24, which are controlled in a manner similar to control of elevator trim tab in a conventional airplane. As soon as cruise speed is reached at specified ground effect flight height, engine is set to corresponding power level. After completion of longitudinal leveling, system for self-stabilization and damping is engaged.

It is possible to create designs that would allow take-off with ADS engaged when necessary angles between AAS and LAW flaperons are preset prior to take-off.

Flights at safe altitudes or levels may be performed with flight controls applied "in airplane fashion", i.e. pitch angle being changed with elevators and center wing high-lift devices being set to a position that ensures maximum quality.

Figure 6:
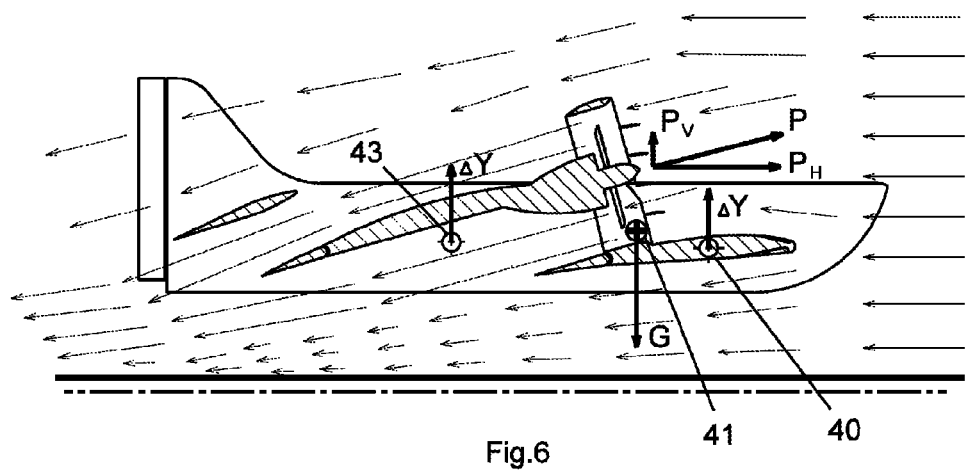
FIG. 6—PS streamline arrangement in ground effect flight operating mode.

FIG. 6 shows streamline of propulsive carrying system in ground effect flight mode and approximate location of center of gravity 41, the focus in terms of height 40 and the focus in terms of angle of attack 43.

It is clear from the Figure that only lower surface of the forward LAW 46 interacts with free approach air flow. With flow around the rear LAW 5, air wedge of dynamic air cushion with high flow angularity and thickness emerges under center wing 25. This is equivalent to increase in center wing aerofoil curvature and allows, for this design configuration, operation of efficient flight at a greater height.

Additional low aspect ratio wings (ALAW) 16 also facilitate greater height of ground effect flight. In addition to an increase in aspect ratio of resultant load-bearing plane, they also prevent air from flowing over from high-pressure region below center wing to low-pressure region above center wing. On ALAWs additional lift forces from induced vortexes emerge, and induced drag decreases. This improves quality of the whole lifting structure.

Climb or descent from level flight is performed by simultaneously increasing or decreasing magnitude of the forward and rear lift forces, for which purpose deflection angles of LAW flaperons, elevons of outer wings are increased or decreased, and/or higher (or lower) engine power is set.

It is known that in an emergency the most effective maneuver for WIG craft to avoid collision with an obstacle is a maneuver in vertical plane with WIG craft leaving ground effect zone and subsequently returning to ground effect zone.

For airplane-type aerodynamic configurations, this maneuver involves a change in pitch angle (angle of attack), disturbance of balance and piloting difficulties during transitions. At higher speeds and greater pitch variations, this may result in reaching supercritical angles of attack and loss of control. Therefore, in such cases very high piloting skills are required.

In contrast, similar maneuver with WIG craft based on group of inventions proposed hereby, is performed with horizontal attitude of fuselage which is maintained either manually or with autopilot. To do this, flaperons of all center wing LAWs (or flaperons of LAW and flaps of outer wings) are simultaneously deflected downwards using single control stick. When this maneuver is performed, the system for self-stabilization and damping described hereinabove is automatically disengaged. As a result of all these actions, and due to an increase in flight height, longitudinal balance is disturbed. The emerging longitudinal moment is compensated with elevators, and balance is restored by the method described hereinabove.

Vertical speed of climb will depend on rate and extent of flaperon deflection. Dynamic climb will be achieved without an increase in engine power. At the same time, angles of attack of the planes that are not blown by propulsion units will decrease in proportion to vertical speed of climb and increase in proportion to vertical speed of descent. This has effect of damping abrupt changes in vertical rate, which increases safety of flight near ground surface.

Once the height of dynamic climb has been reached, the craft begins to descend to a height where level flight can be maintained with new positions of wing high-lift devices of lifting surfaces. Another option for vertical maneuver in an emergency can be an engineering solution where engine power automatically increases as soon as certain gradient of flaperon deflection is exceeded. This would enable continued flight at dynamic climb height.

Aerodynamic configurations of WIG craft that are proposed as embodiment versions for this group of inventions, and current state of the art, allow for creation of systems with gyrostabilization capability that would enable emergency vertical maneuver with engaged autopilot maintaining zero pitch.

During ground effect flight, coordinated turns are performed (without sliding) with necessary roll angle and with same height maintained.

Landing from ground effect mode would be performed by way of gradually decreasing engine power and descending to minimum possible (according to environmental conditions) flight height. Leading-edge flap (nose flap of fuselage), flaperons of LAW, aerodynamic deceleration devices and reversers are deflected proportionally as speed decreases, with subsequent transition to static SAC movement mode. Taxiing on SAC or touch-down on ground (water surface) will be performed with minimum or zero ground speed.

Landing from any flight height may be performed with a steep descent path, up to parachuting with horizontal fuselage attitude. For this purpose, minimum engine power that is sufficient for maintaining control is applied at current flight height or during descent, and LAW high-lift devices are deflected into positions corresponding to movement on SAC. Attitude of WIG craft and path of descent (vertical rate or ground speed) are adjusted with deflections of control surfaces, deflections of LAW flaperons and engine power settings. Vertical take-off and hovering are performed by way of simultaneously setting vectors of resultant thrust forces of propulsion units into vertical position. To do this, LAWs (or parts thereof) on which propulsion units are mounted are moved about their lateral axes until thrust force vectors are in vertical position, after which engines are set to take-off power. Spatial movement and stabilization of WIG craft are performed using LAW flaperons, elevators and rudders, changes in directions of vectors of thrust of propulsive units and in magnitude of thrust.

FIG. 7-10) demonstrate variability of the group of inventions proposed hereby. The Figures show general arrangements of some of the possible versions of WIG craft with application of single structural base group and single propulsion unit in longitudinal direction.

Figures 7, 8:
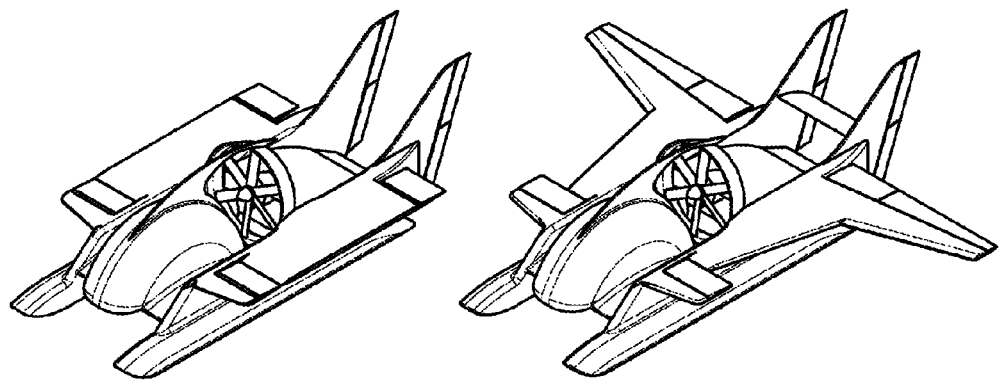
FIG. 7-10)—Versions of WIG craft with single SBG lengthwise. Main view.
Figure 11:
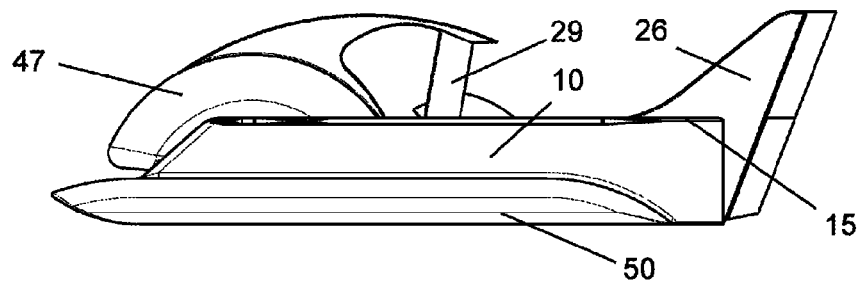
FIG. 11 (a)—WIG craft acc. to FIG. 7. Side view.
Figure 11:
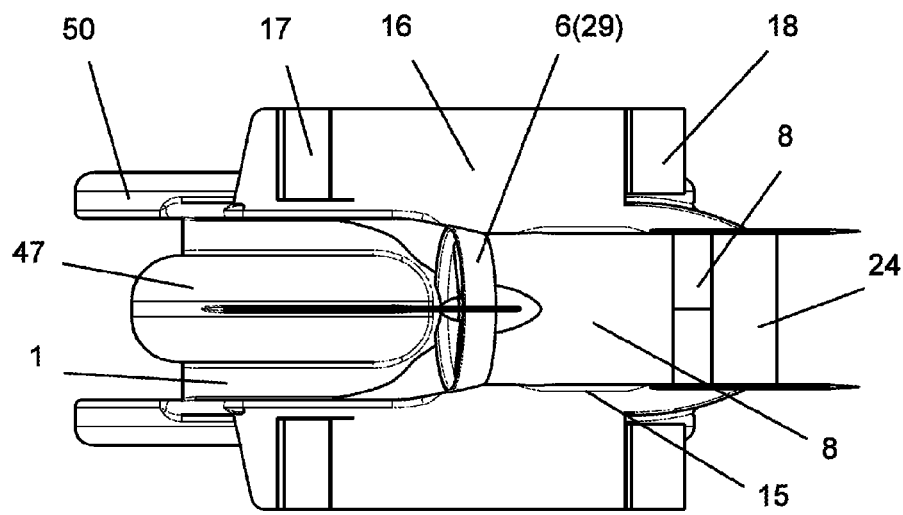
Figure 11:
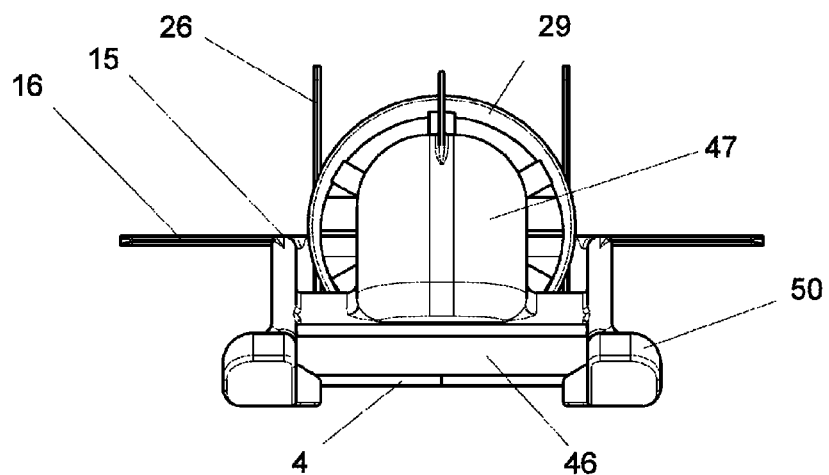
Figure 12:
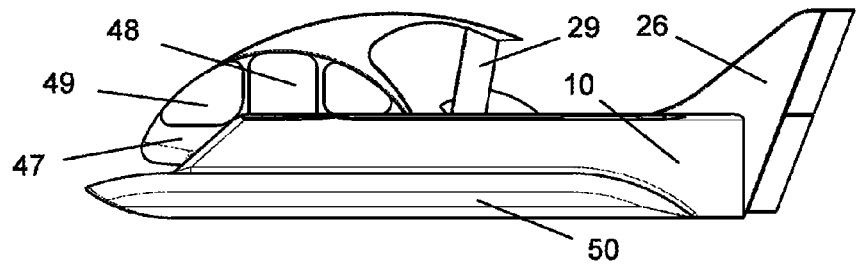
FIG. 12 (a)—WIG craft acc. to FIG. 8. Side view.
Figure 12:
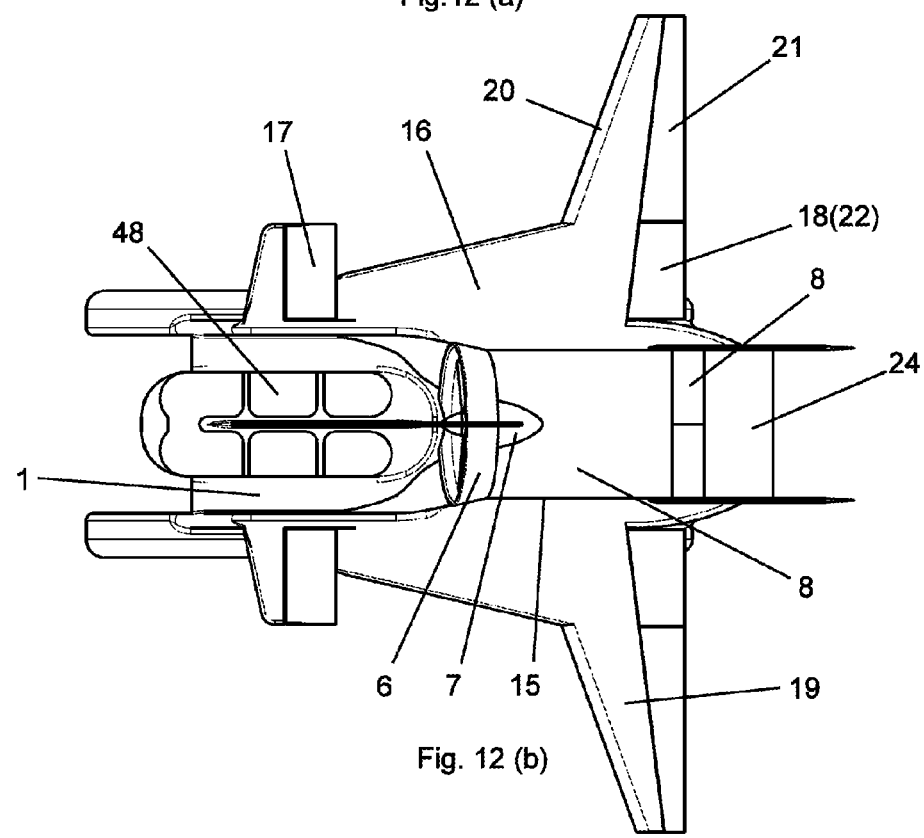
Figure 12:
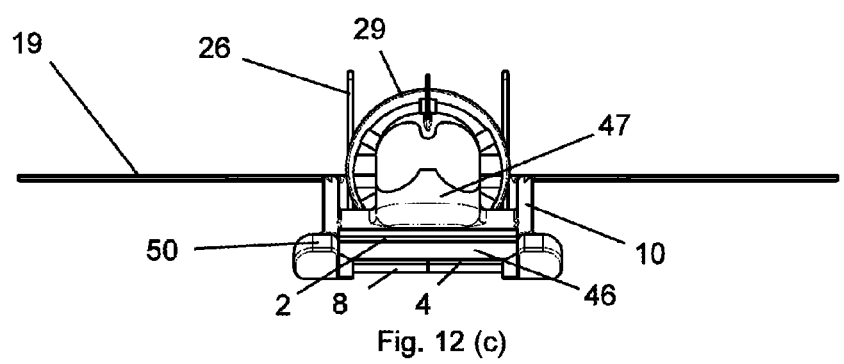

FIG. 11 (*a-c*) shows three views of a light multi-functional type A WIG craft first shown on FIG. 7. Windows are shown on FIG. 9 (*a-c*). Cockpit and passenger cabin structure 47 is mounted on the forward LAW and is easily accessible for boarding and exiting the craft through side doors 48 (or hatches). Windows 49 provide unobstructed field of vision in the upper hemisphere. APF floats may be made, for example, in the form of inflatable balloons 50;

FIG. 12 (*a-c*) shows three views of a light multi-functional type B and C WIG craft first shown on FIG. 8, which results from addition of outer wings 19 to WIG craft shown on FIG. 7. As a version of such configuration, two SSPs positioned close to each other with lesser diameters of the rings may be applied instead of one SSP 6. This will increase span of LAW (quality improvement) and decrease height of the point of application of thrust forces.

Figure 9:
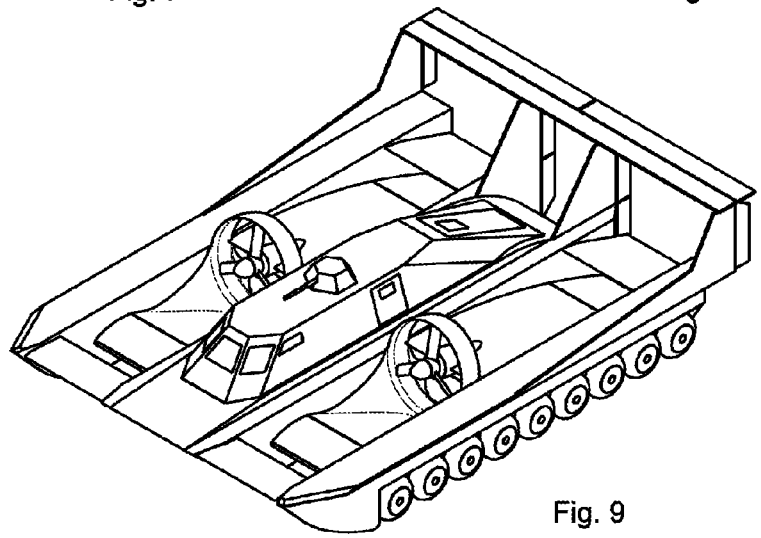

FIG. 13 (*a-c*) shows three views of a type A patrol WIG craft first shown on FIG. 9, which is intended for use by border/coast guard, customs, fisheries patrol and other services. To improve amphibiousness, ground movement performance at reduced engine power and with reduced ground pressure, APF floats may be, for example, made in the form of multi-axle wheeled landing gear. Wheels are made in the form of lightened low-pressure tyres 51 with small relative diameter of hubs and covered with fairings 52 on external sides. Automatic gun turret 53 with remote control is installed on cockpit roof top. Entrance door (hatch) 48 is arranged on the rear wall of cockpit 47, and additional (emergency) hatches 54 are located on either side. Cockpit may be armor-plated. Fuselage 55 is made in the form of boat hull with sidewalls. In the aft section of the tunnel 56 transom plate 57 is installed which is of damped design. Keels of skegs 58 and APF floats 10 are executed in the form of hydroskis 59 and lie in the same plane.

Figure 14:
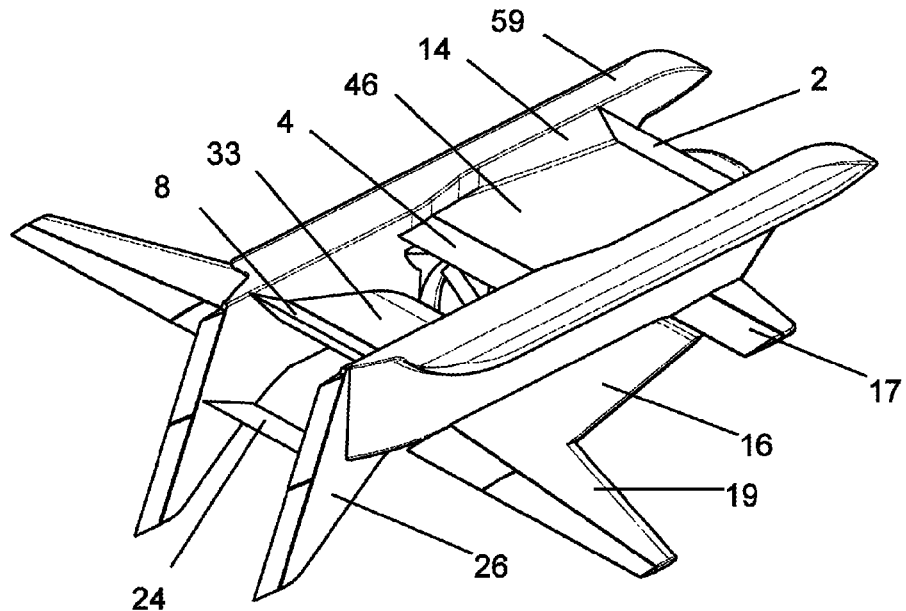
FIG. 14—WIG craft acc. to FIG. 8. Main bottom view.
Figure 15:
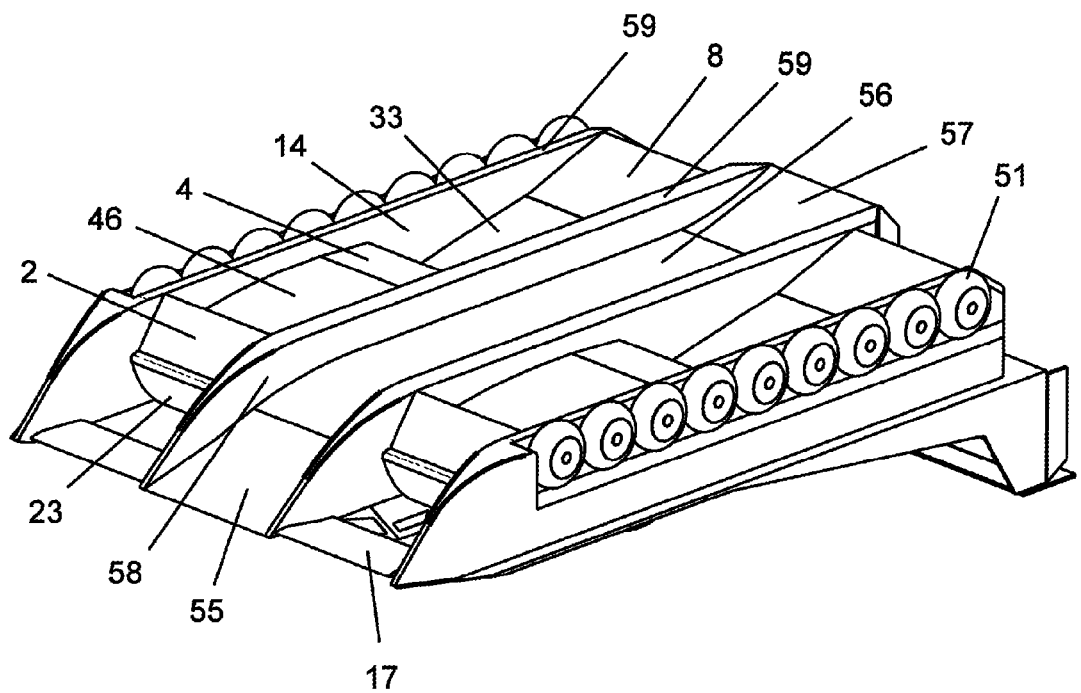
FIG. 15—WIG craft acc. to FIG. 9. Main bottom view.

FIG. 14 and FIG. 15 show WIG craft first shown on FIG. 8 and FIG. 9. Bottom view of general arrangement with propulsive and lifting structures high-lift devices in position for static air cushion operating mode.

Figure 10:
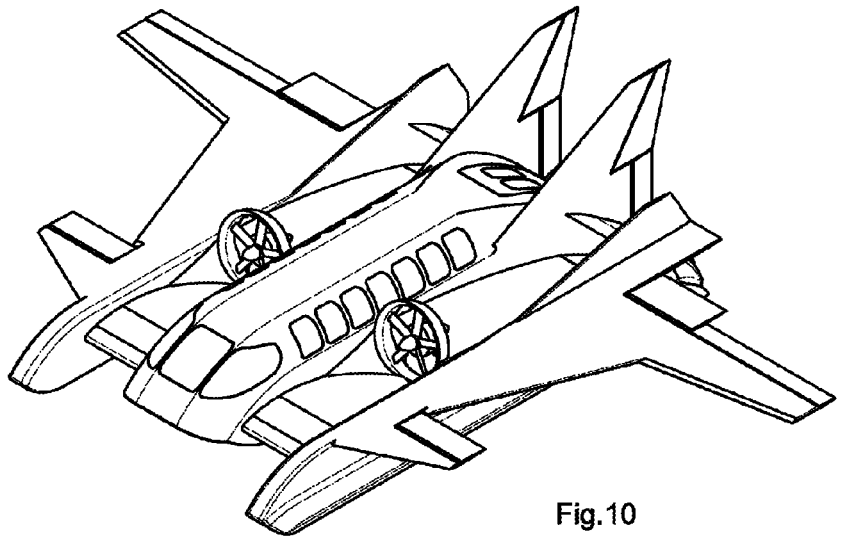
Figure 16:
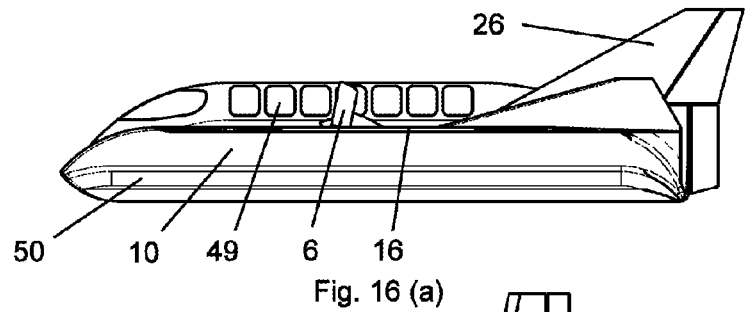
FIG. 16 (a)—WIG craft acc. to FIG. 10. Side view.
Figure 16:
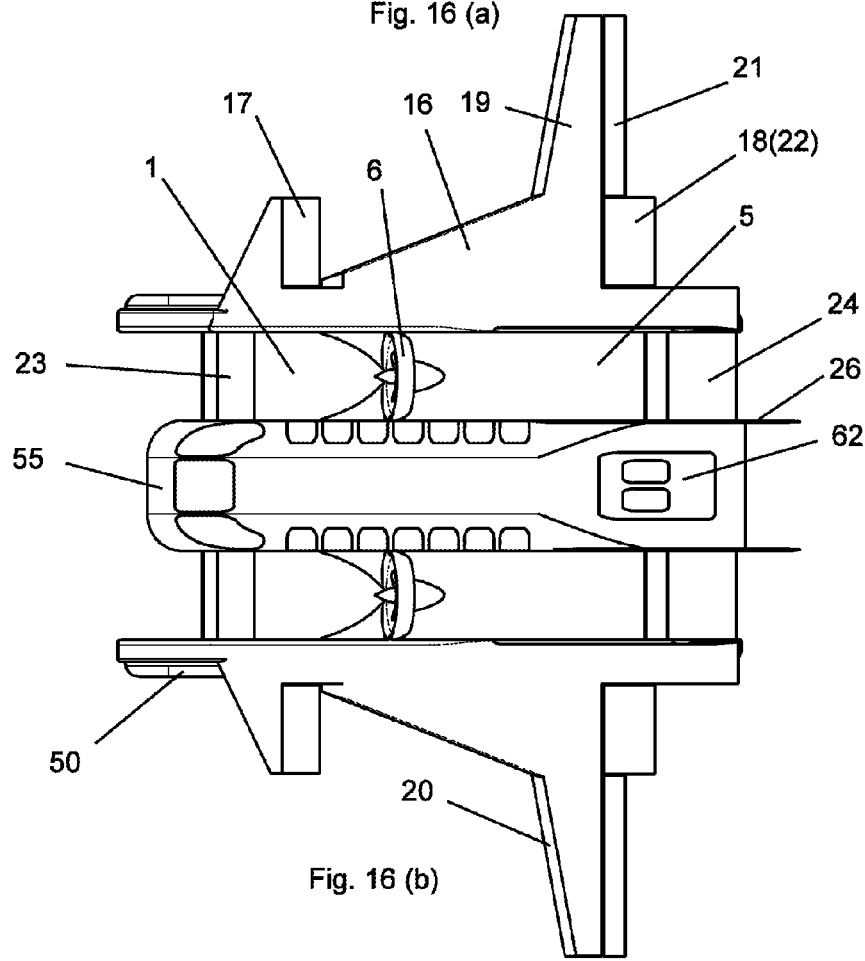
Figure 16:
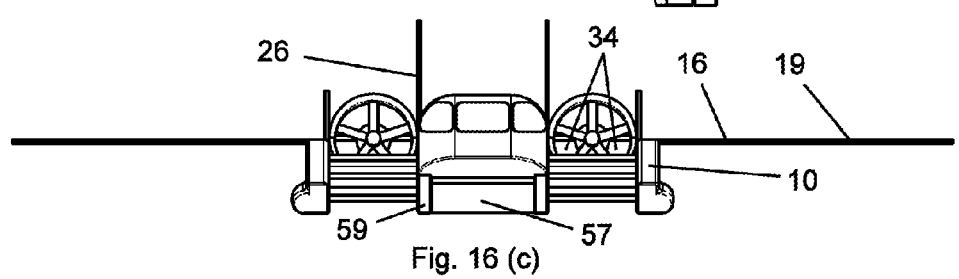
Figure 16:
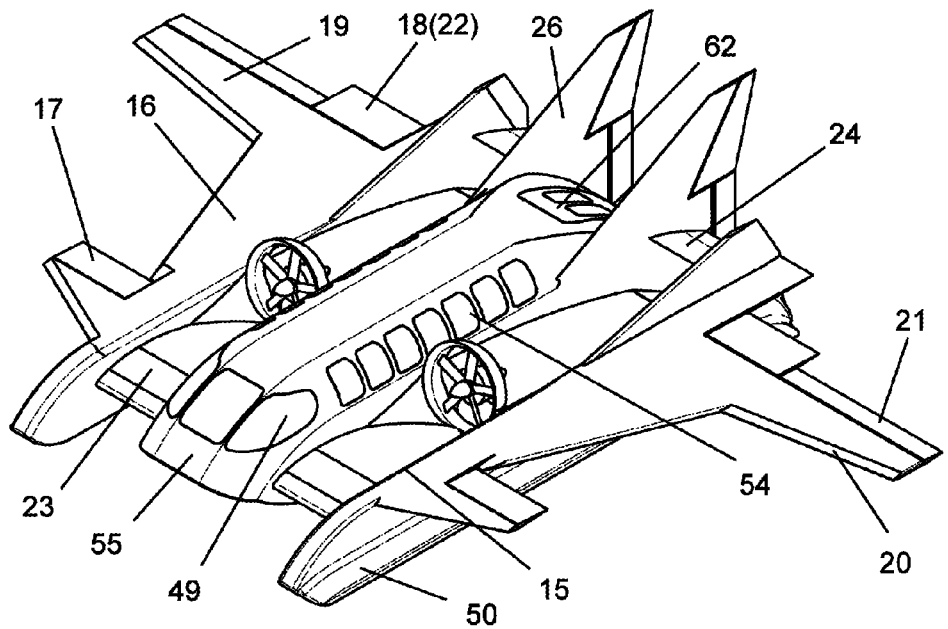
Figure 16:
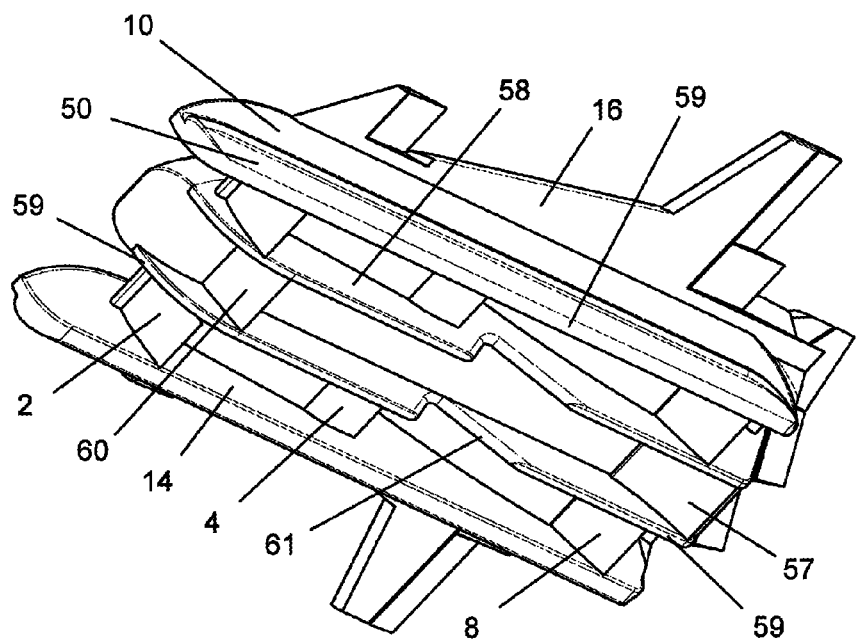

FIG. 16 (*a-c*) shows three views of type B and C WIG craft first shown on FIG. 10. On the basis of this configuration both general-use and special-purpose WIG craft may be constructed. Weight categories: from light (min. 0.5 tons) to medium (50-100 tons). Fuselage 55 may be made in the form of boat hull with flat-keeled, gliding or skeg-type lines. Stems of hulls may be arranged ahead of or behind the forward LAW. The keel(s) of hulls made in the form of hydroskis 59 may serve as support surfaces while the craft stands on ground, and may lie in the same plane with support surfaces of APFs. All support surfaces may be made damped, from a durable low-friction material.

Tunnel 56 is fitted with nose flap 60 and transom plate 57. Lines of skeg keels 58 have upward inclination sections 61 within the range of lengths of static-and-dynamic air cushions of the second and subsequent LAWs. Upward inclination sections 61 serve as air ducts through which excessive pressure is delivered to tunnel 56 when static air cushion is created. Between the fins of two-fin tail unit 26 passenger/cargo door 62 is provided.

FIG. 16 (*d-e*) shows general arrangements of WIG craft first shown on FIG. 10, with designations of elements. The bottom view shows wing high-lift devices in position for static air cushion operating mode.

Figure 17:
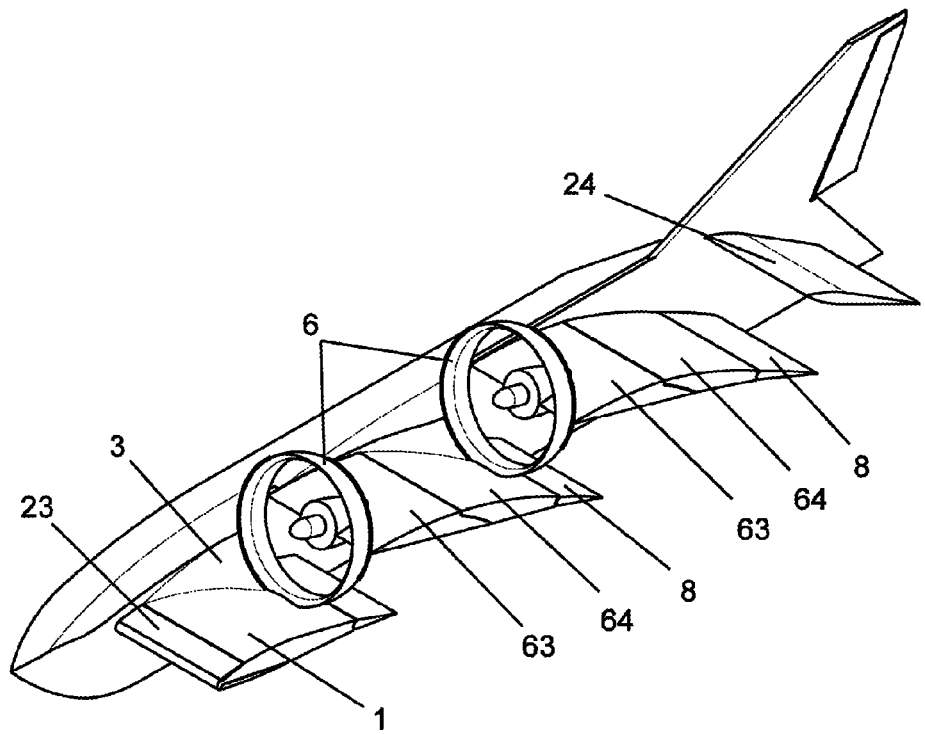
FIG. 17—Main view of RH side propulsive structure with two SBGs. Fuselage is not shown. Wing high-lift devices are in cruise position.

FIG. 17 shows general arrangement of propulsive structure (PS) on the RH side with two base structure groups (BSG) and two propulsion units. Fuselage and additional wings are not shown. High-lift devices are in cruise flight configuration. The structure is designed for vertical take-off operations. Additionally, the Figure shows possible configuration of BSG in the longitudinal direction. Configurations in the lateral direction with one or more BSGs are also possible. Thus, propulsive structure for super-heavy WIG craft may be constructed. In the structure shown on FIG. 17 the second and the third LAWs are made identical. Each comprises three parts: movable part with propulsion unit 63, fixed part 64 and flaperon 8.

Figure 18:
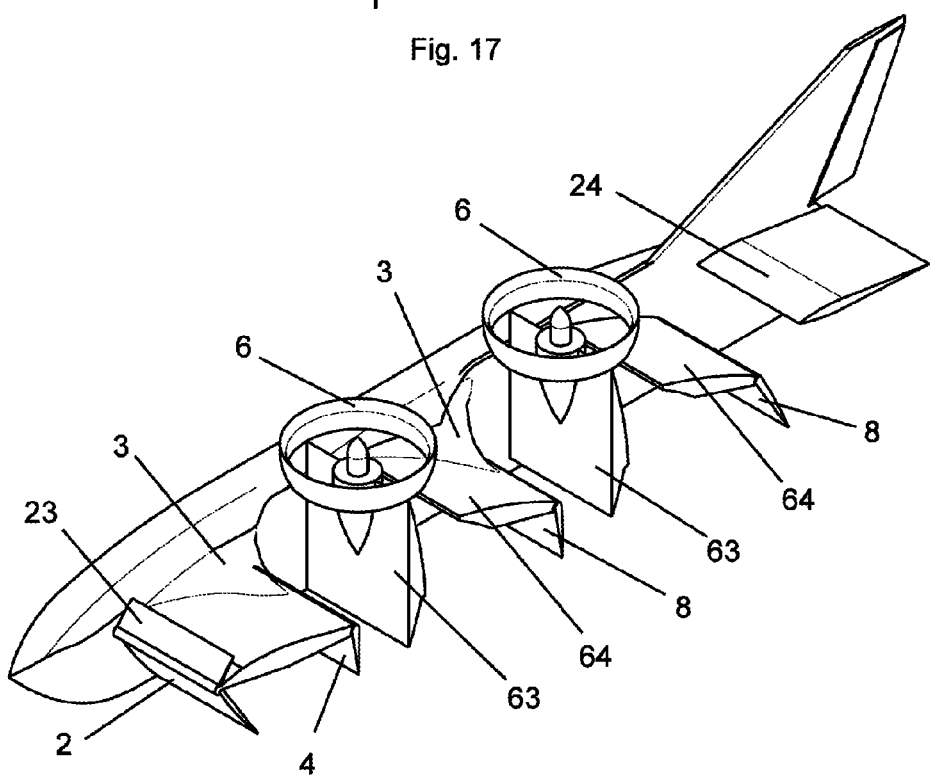
FIG. 18—Main view for FIG. 17. Wing high-lift devices in vertical take-off/landing positions.

FIG. 18 shows high-lift devices of PS first shown on FIG. 17 which is set in position for vertical take-off/landing.

Figure 19:
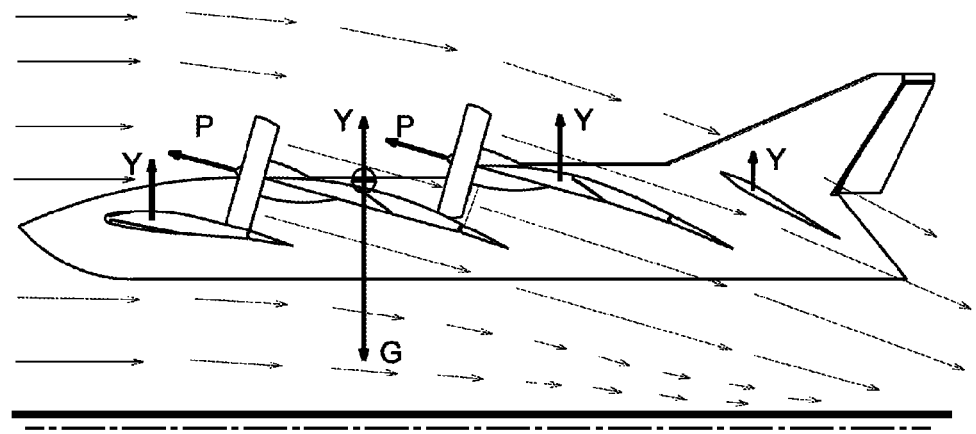
FIG. 19—Streamline configuration acc. to FIG. 17. Ground effect mode.
Figure 20:
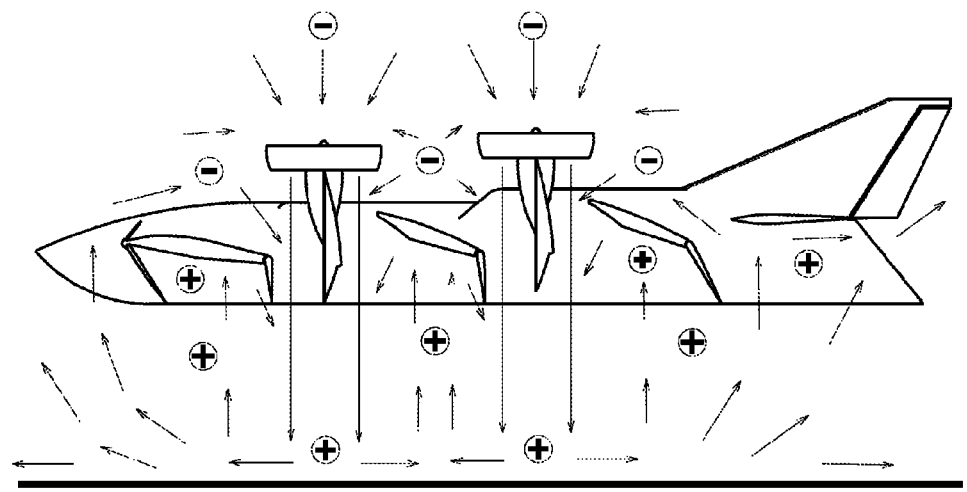
FIG. 20—Streamline configuration acc. to FIG. 18. Vertical take-off mode.
Figure 21:
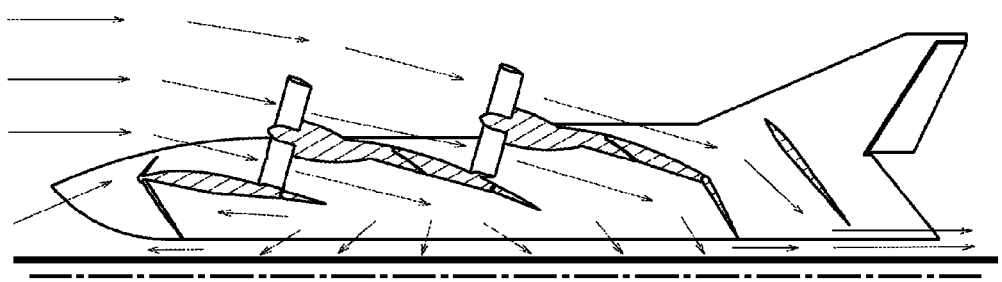
FIG. 21—Streamline configuration acc. to FIG. 17. Static air cushion mode.

FIG. 19 shows streamline arrangement of PS first shown on FIG. 17 in ground effect operating mode. FIG. 20—Streamline arrangement of PS first shown on FIG. 17—vertical take-off mode. FIG. 21—Streamline arrangement of PS first shown on FIG. 17—static air cushion operating mode.

Figure 22:
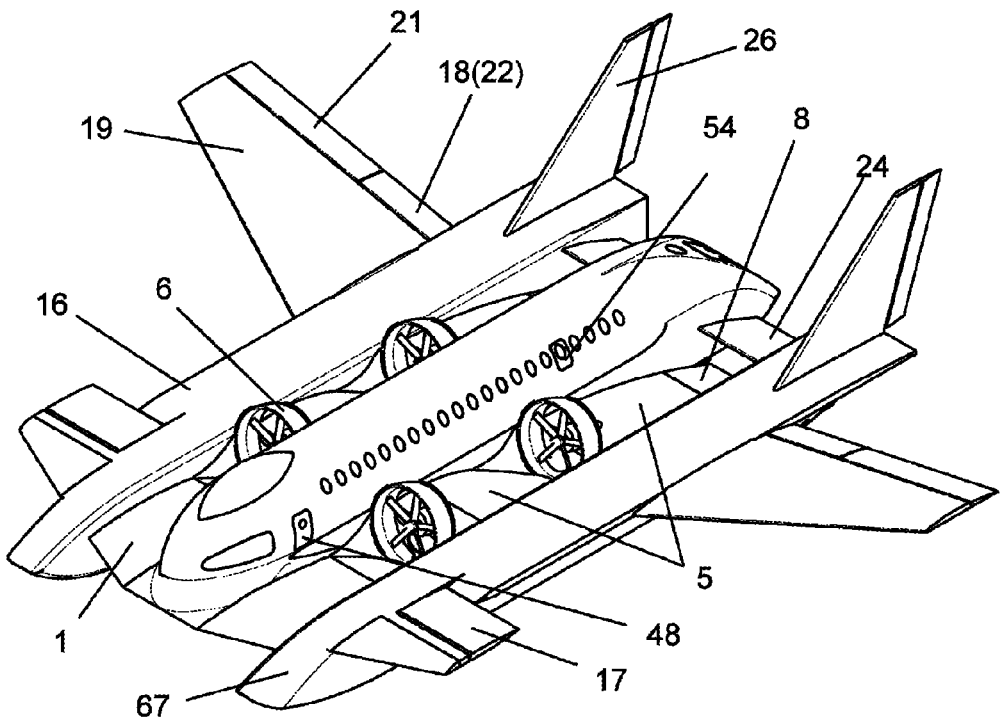
FIG. 22—Medium or heavy WIG craft acc. to FIG. 17. Types B and C. Main view.

FIG. 22 shows aerodynamic configuration (2×2) of a medium or heavy WIG craft with propulsive structure shown on FIG. 17. Types B and C—general arrangement. In this aerodynamic configuration, lower surface of fuselage (bottom) 65 is made as continuation of lower surface of the forward LAW in the form of flat lifting surface with nose flap 60 and transom plate 66. Transom plate 65 together with elevons of rear LAWs 8 make up rear enclosure of SAC and in flight is retracted in stow position flush with the bottom. Floatation of WIG craft is ensured with APF floats made in the form of rigid streamlined gliding half-hulls 67.

Figure 23:
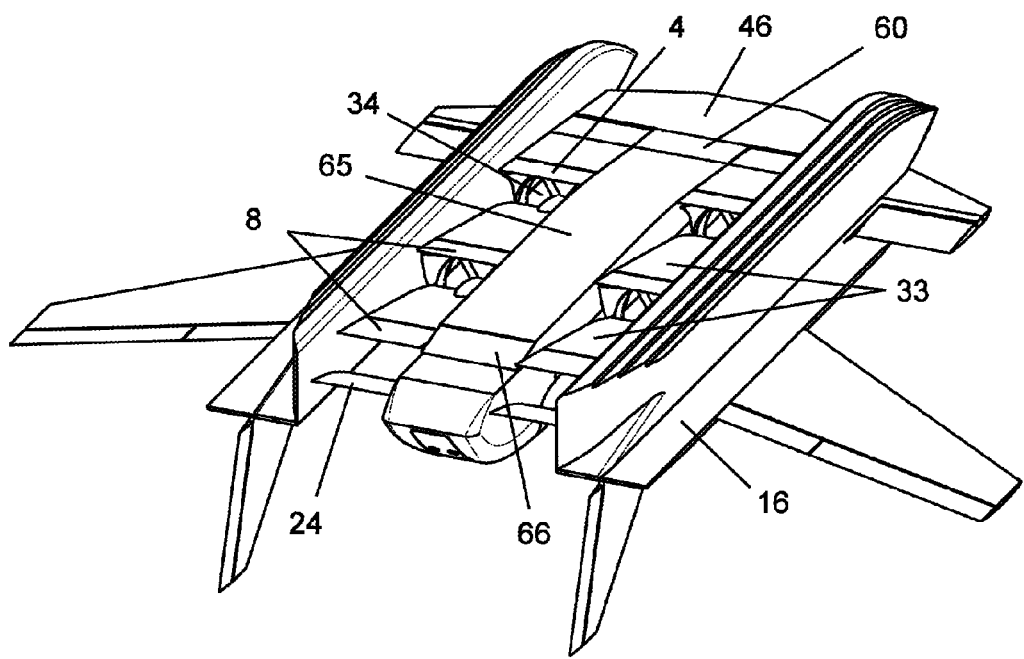
FIG. 23—WIG craft acc. to FIG. 22. Main bottom view. Wing high-lift devices for cruise mode.

FIG. 23—WIG craft first shown on FIG. 22—general arrangement, bottom view. High-lift devices are in cruise flight configuration.

Figure 24:
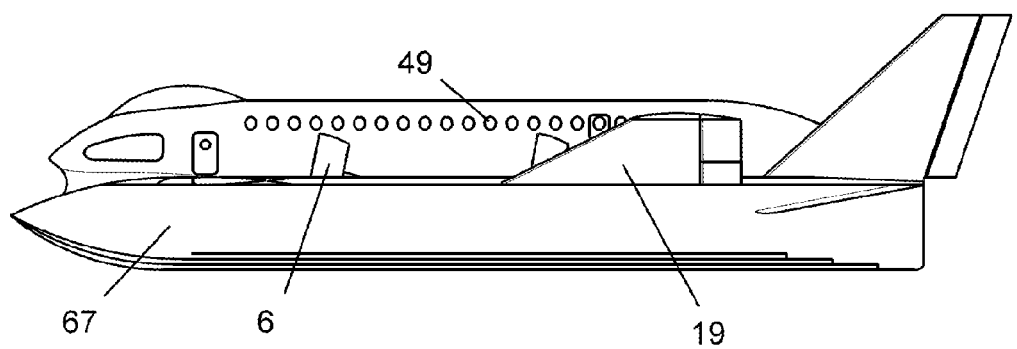
FIG. 24 (a)—WIG craft acc. to FIG. 22. Side view.
Figure 24:
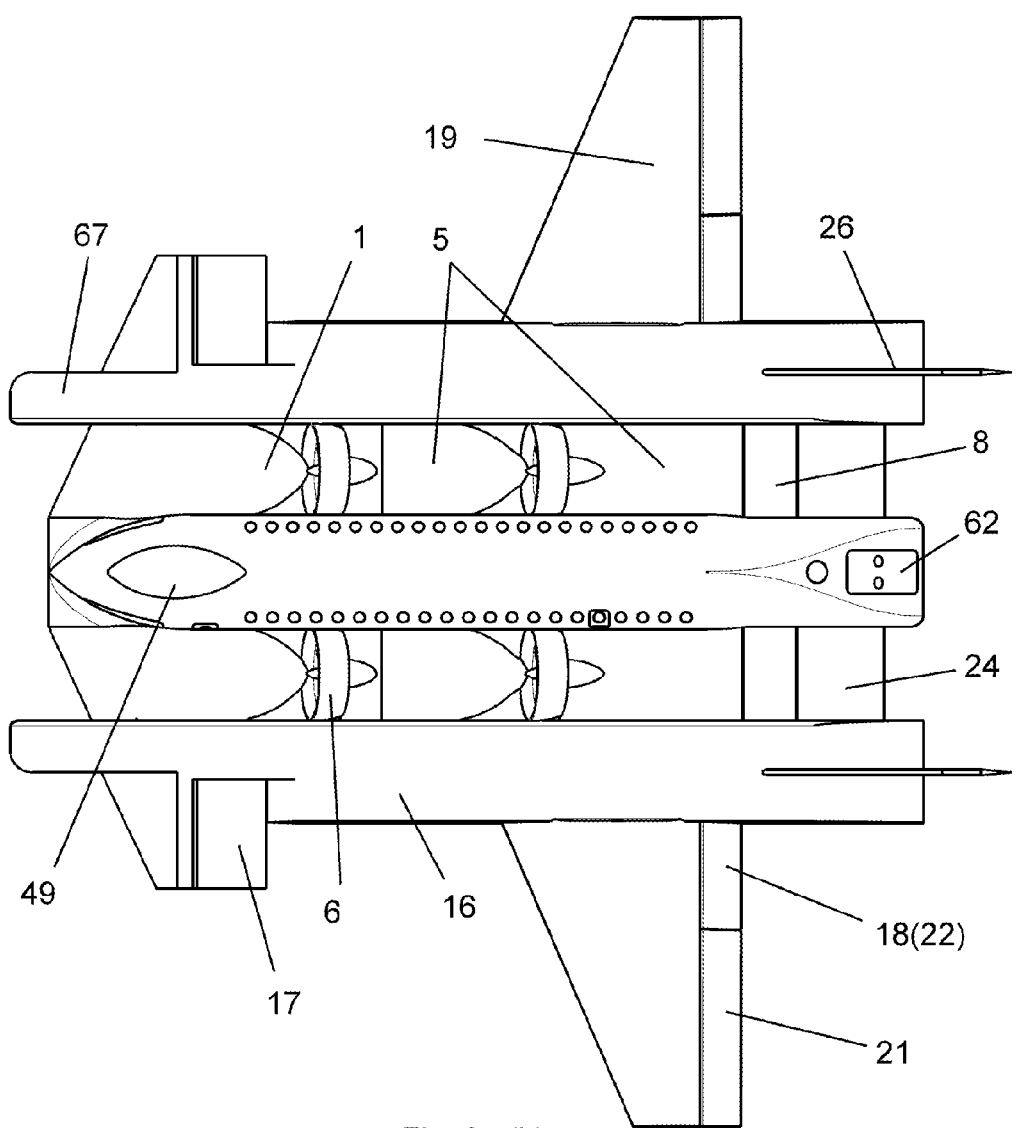
Figure 24:
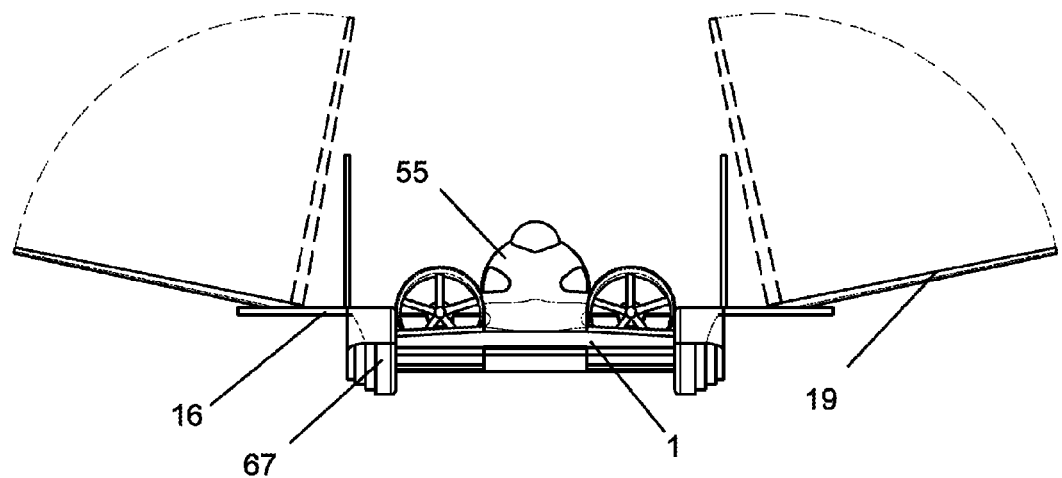
Figure 25:
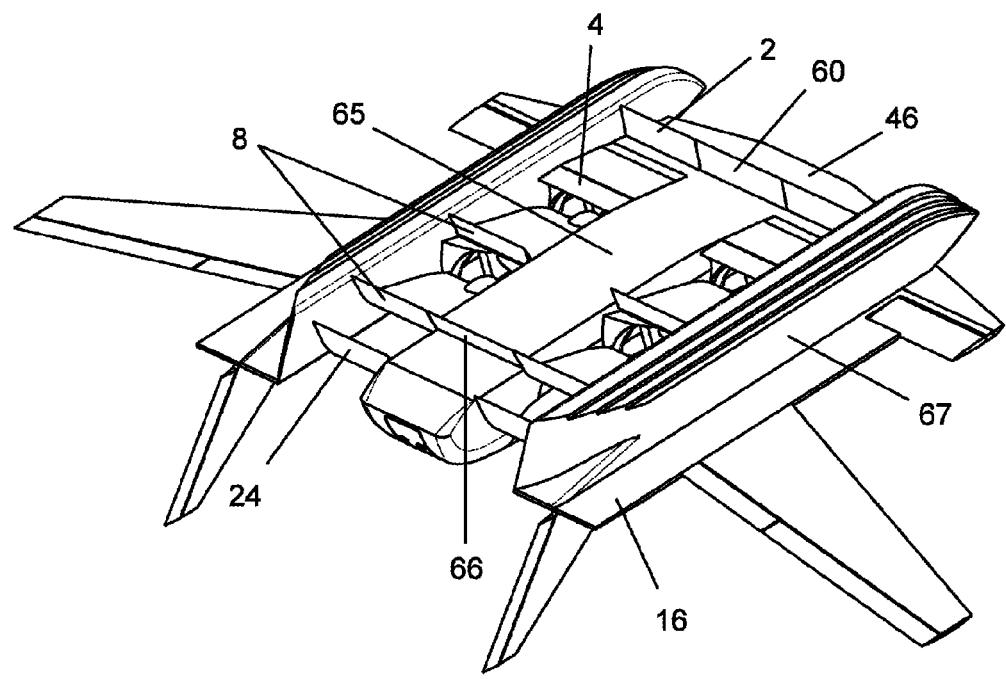
FIG. 25—WIG craft acc. to FIG. 22. Main view bottom view. Wing high-lift devices in positions for SAC.
Figure 26:
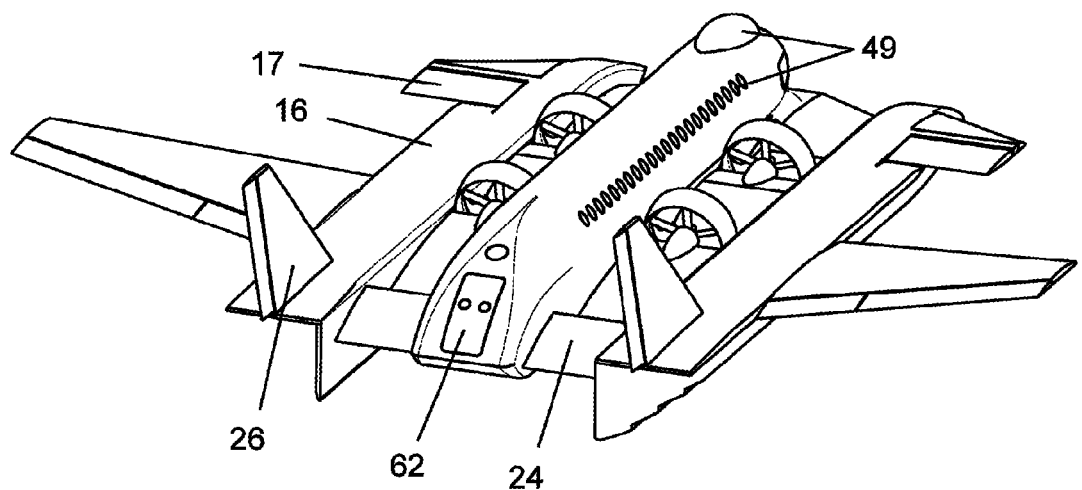
FIG. 26—WIG craft acc. to FIG. 22. Main arrangement, rear view.

FIG. 24 (*a-c*) shows three views of WIG craft first shown on FIG. 22. Front view (FIG. 24 (*c*)) shows trajectories and positions of outer wings when outer wings are lifted to mooring position. Positions of high-lift devices for SAC are shown on FIG. 25. General arrangement bottom view is shown on FIG. 26.

Figure 27:
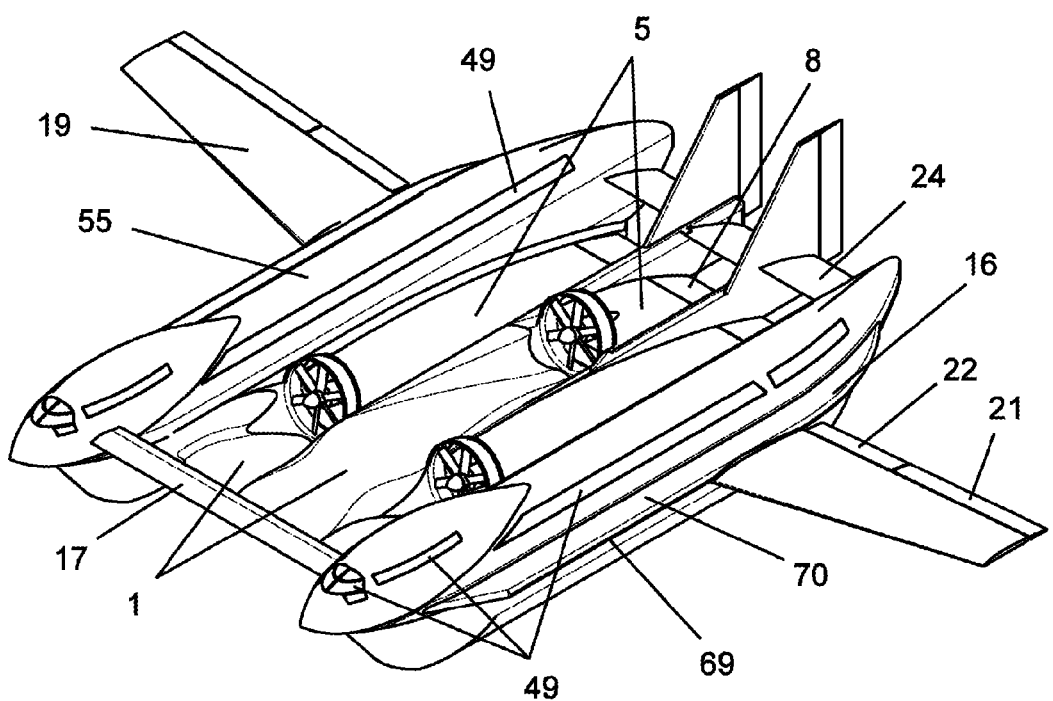
FIG. 27—Medium or heavy WIG craft with PS. Types B and C. Main view.

FIG. 27 shows general arrangement of aerodynamic configuration version for medium or heavy WIG craft where two main fuselages 55 act as aerodynamic plate-floats. In this layout three-point support configuration is implemented. Number of SSPs may be considerably greater. SSPs may be positioned individually or in groups, at sides of a triangle or parabolically. With this arrangement slipstreams (jets) from SSPs will create a dome-shaped dynamic air cushion under common center wing. In horizontal plane, borderline 68 of such air cushion may be of triangular, stepped-triangular or parabolic shape with its top directed backwards. This is equivalent to sweep forward of trailing edge of load-bearing plane under which dynamic air cushion is created. Such shape of trailing edge is known to increase longitudinal stability of low aspect ratio continuous single wing in ground effect operating mode. Therefore, WIG craft aerodynamic configuration shown on FIG. 27 provides additional component of longitudinal stability from dynamic air cushion. Another version of configuration shown on FIG. 27 is arrangement of SSPs at each side of a triangle with its top pointing in the forward direction. In this case, two dynamic air cushions will be created having shape, in horizontal plane, of right triangles with sides coinciding with leading edge of center wing and internal walls of fuselages. Distinctive features of this layout are rectilinear sides of fuselages and fender bar 69 that is used when outer are lifted into mooring position. This enables use of existing ports as hubs in WIG craft transportation networks. Mooring operations and handling of passengers and cargoes are considerably simplified and, more importantly, safety of these operations increases. Furthermore, upper surface 70 of ALAW 16 is used as a convenient deck.

Figure 28:
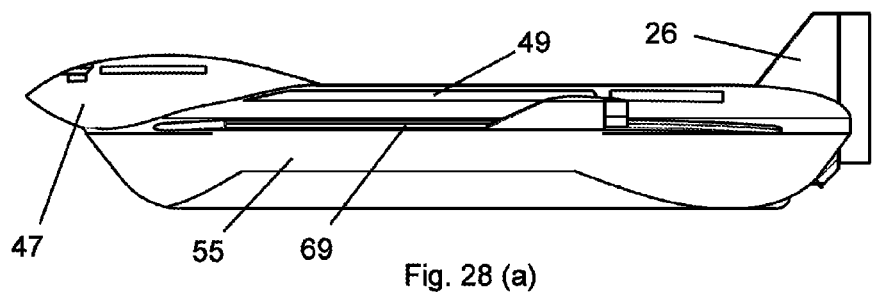
FIG. 28 (a)—WIG craft acc. to FIG. 27. Side view.
Figure 28:
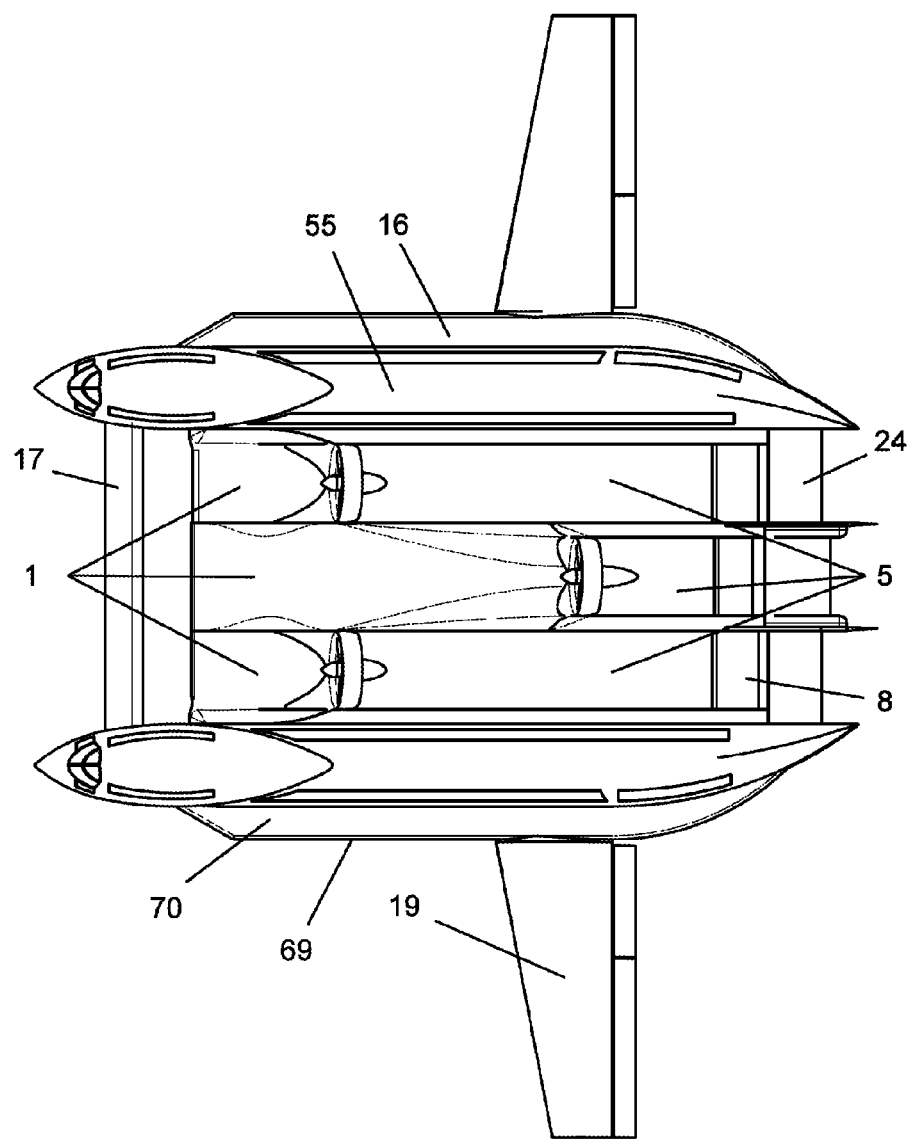
Figure 28:
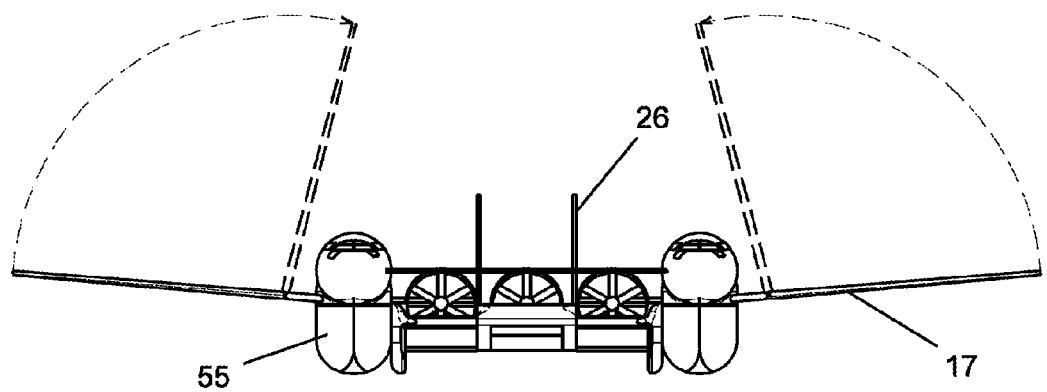
Figure 28:
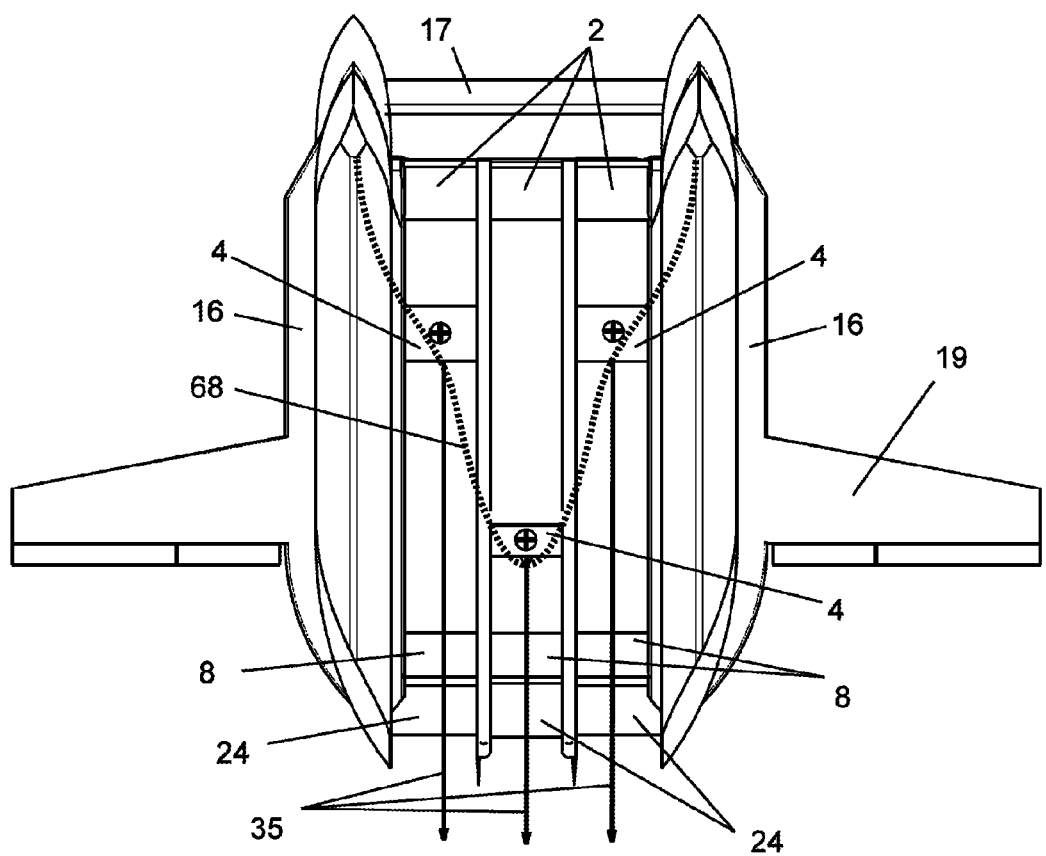

FIG. 28 (*a-c*) shows three views of WIG craft first shown on FIG. 27.

Figure 29:
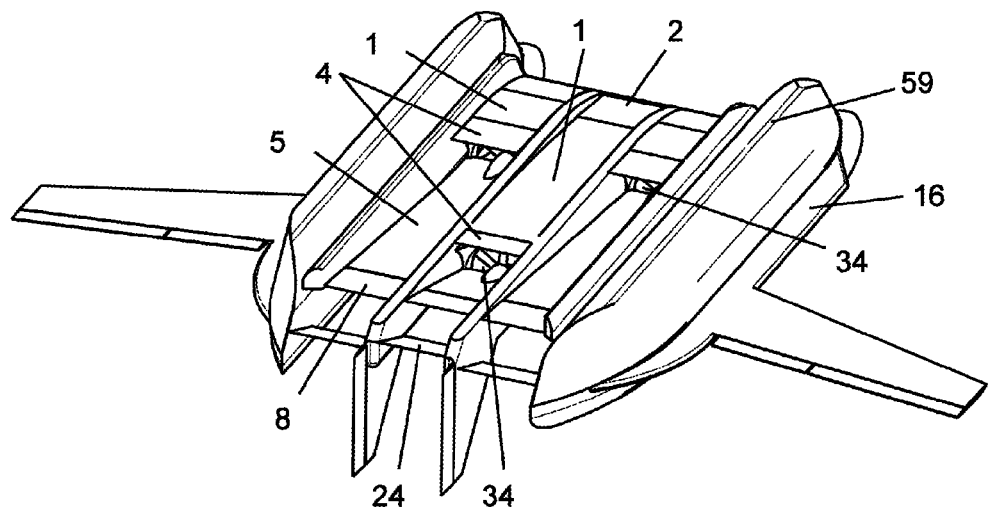
FIG. 29—WIG craft acc. to FIG. 27. Mai bottom view. Wing high-lift devices for cruise mode.
Figure 30:
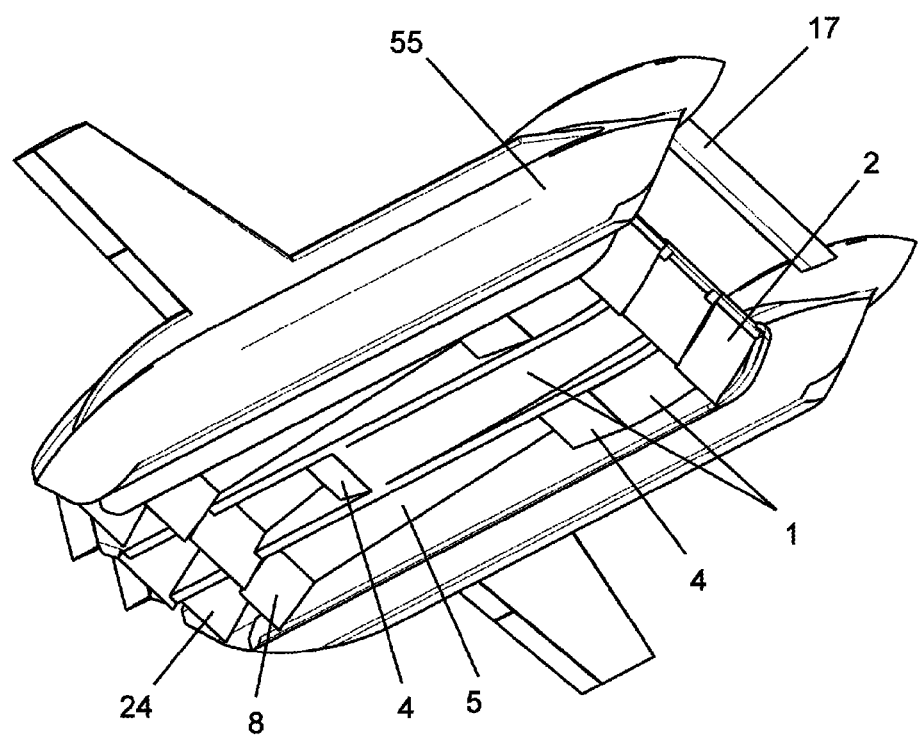
FIG. 30—WIG craft acc. to FIG. 27. Main bottom view. Wing high-lift devices in positions for SAC.

FIG. 28 (*d*)—Bottom view—shows approximate borderline 68 of dynamic air cushion. Positions of high-lift devices for cruise mode and SAC mode are shown on FIG. 29 and FIG. 30.

Figure 31:
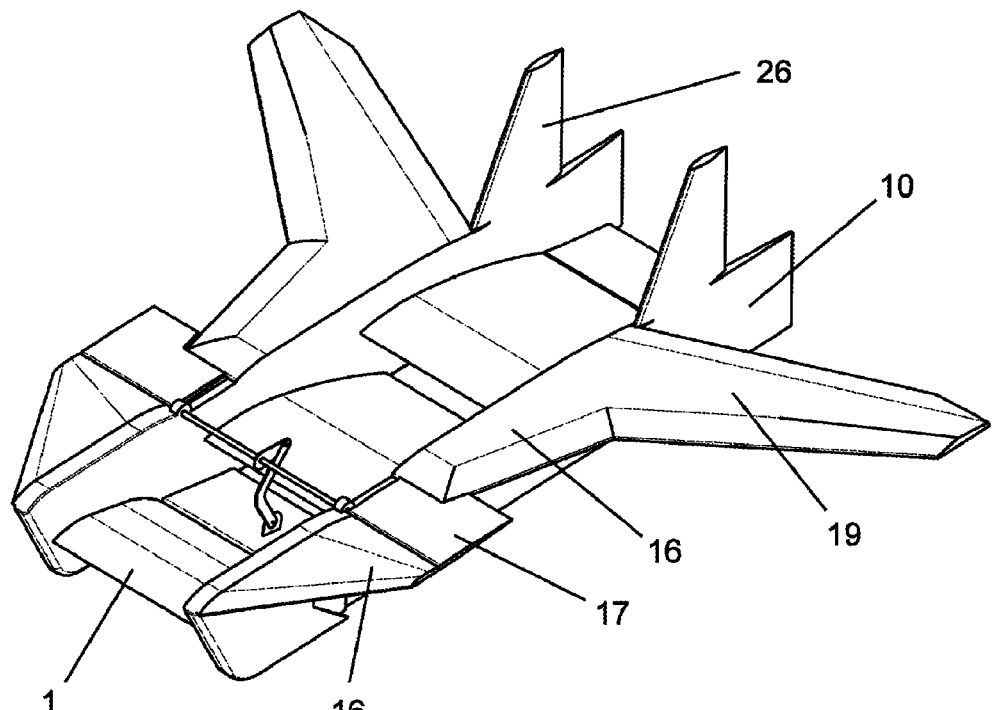
FIG. 31—Free-flying (unpowered) model. Main view.
Figure 32:
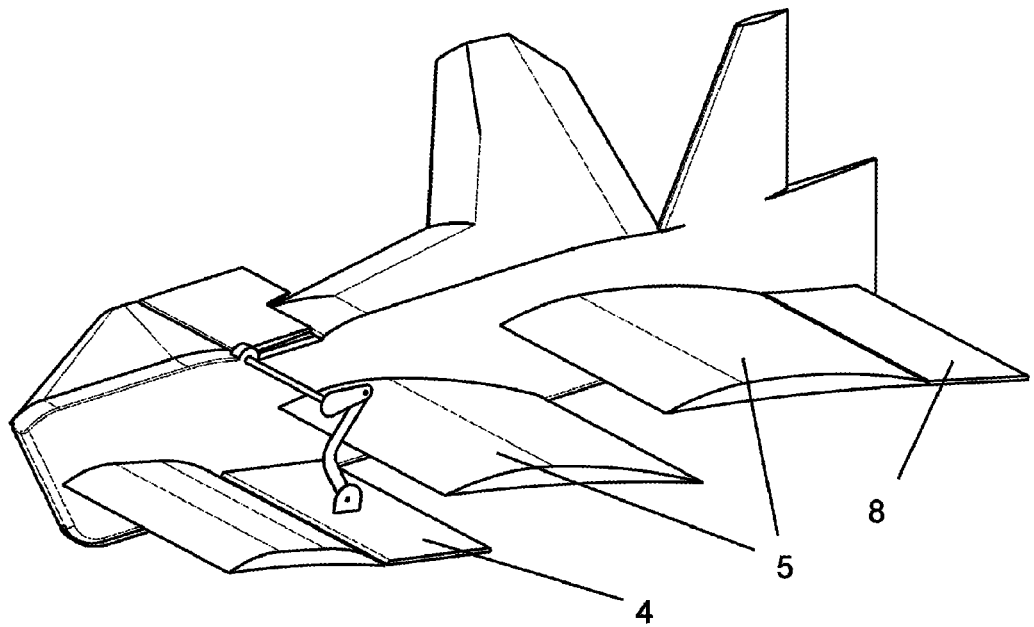
FIG. 32—Free-flying (unpowered) model. Main view. LH wings and APFs are not shown.
Figure 33:
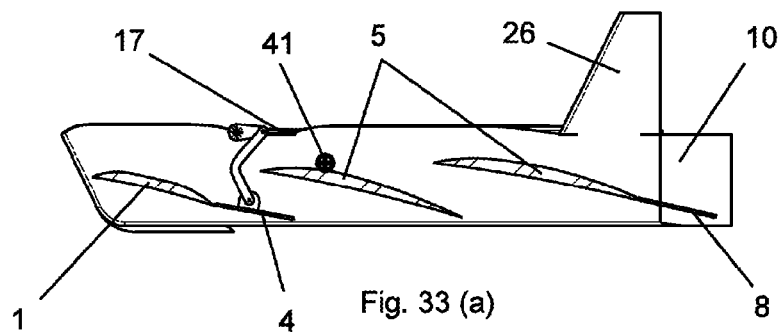
FIG. 33 (a)—Model acc. to FIG. 31. Side view. Sectional view.
Figure 33:
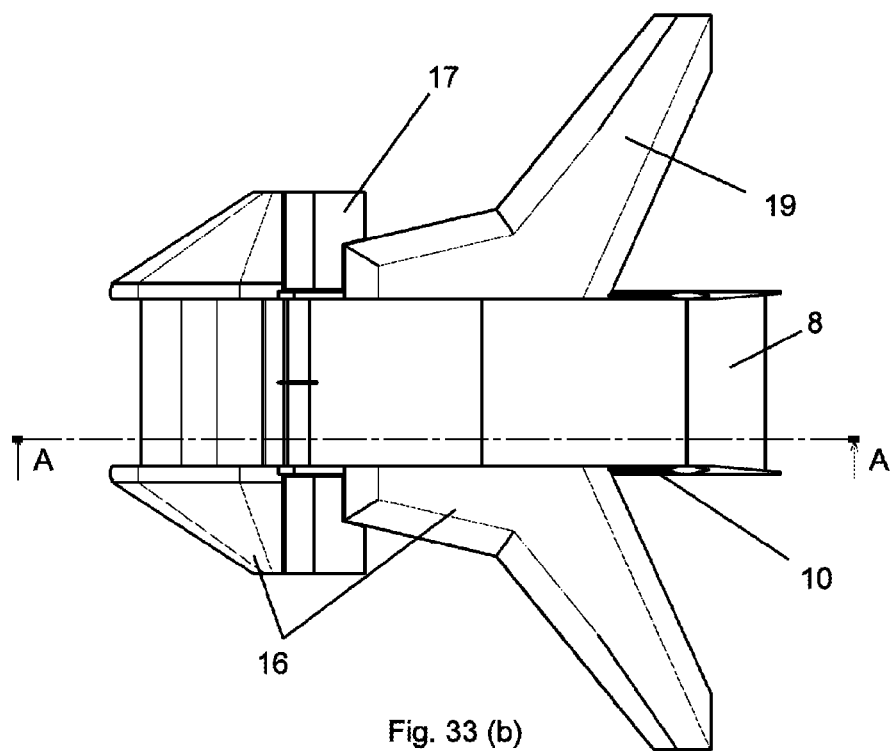
Figure 33:
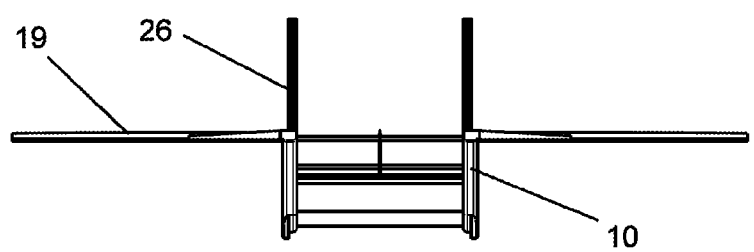

FIG. 31, FIG. 32 and FIG. 33 (*a-c*) show aerodynamic configuration of an unpowered model in which some of the conceptual proposals for this group of inventions are embodied.

Detail of disclosure of the methods, and of the versions of wing-in-ground effect craft structure for the realization of the methods, is sufficient for application of the group of inventions proposed hereby in the industry with achievement of the claimed results.

In use, it can now be understood that a method of using a wing-in-ground-effect craft (WIG craft) to allow integrated increase in aerodynamic and cargo-carrying characteristics can be used by the following steps:

a) generating required lift force (LF) using a high air pressure region between a load-carrying low-aspect-ratio wing (LAW) and a supporting surface, and by way of blowing off flow from an upper surface of the LAW;

b) creating progressive motion using thrust propulsion units, pitch, roll and yaw controls, wherein that a natural character of dependence of a magnitude of the lift force and locations of focuses of the low-aspect-ratio wing on angle of attack and height of flight is changed via creation, in longitudinal direction, of at least one a forward region of lift force generation and at least one rear region of lift force generation;

c) positioning points of application on a longitudinal axis ahead of and behind a center of gravity (CG), through the use of at least one forward LAW, at least one rear LAW and aerodynamic plate-floats (APF), the forward LAW having a leading edge flap, a semiannular section of an upper surface and flaperons, the at least one rear LAW having with a shrouded-screw propulsor (SSP), an engine and flaperons, the APF being joined wing-to end surfaces of the at least one forward LAW and the at least one rear LAW;

d) creating different conditions of flow of air streams around the APF;

e) forming a static air cushion (SAC), a dynamic air cushion (DAC) and a static-and-dynamic air cushion (SDAC) under the at least one forward LAW and the at least one rear LAW;

f) creating a low air pressure region with reduced irregularity in a longitudinal direction above the WIG craft, with mutual compensation of moments of the forward and rear region lift forces relative to the center of gravity, and positions of the focus in terms of height ahead of the center of gravity, and of the focus in terms of angle of attack behind the center of gravity, which is positioned between the focus in terms of height and a point of midway between the focuses;

g) allowing for interaction of undisturbed free approach air with a lower surface and partially with an upper surface of the at least one forward LAW;

h) reducing the interaction of the undisturbed free approach air with the upper surface of the at least one forward LAW through suction of air layer over an entire span of the upper surface with the SSP, and interaction thereof with lower and upper surfaces of the at least one rear LAW is prevented by blowing off the lower and upper surfaces of the at least one rear LAW over an entire span with the SSP;

i) controlling magnitudes of the forward and rear lift forces through variations of at least one of deflection angles of the flaperons of the at least one forward LAW and the at least one rear LAW, and power setting of the SSP;

j) (1) stabilizing the flight and dampening pitch fluctuations through automatic variation of forward lift force magnitude as a function of pitch angle as strong reversed feedback, the variations being effected by way of dynamic control of positions of the at least one forward LAW flaperon to actuating devices of which control inputs from an angle of attack sensor (AAS) are transmitted;

j) (2) stabilizing the flight and dampening pitch fluctuations through automatic variation of rear lift force magnitude as a function of pitch angle as strong positive feedback, the variations being effected by way of dynamic control of positions of the rear LAW flaperon to actuating devices of which control inputs from an angle of attack sensor (AAS) are transmitted;

k) using the SSP to create progressive motion, blow off and suck flow from upper surfaces of load-carrying planes;

l) removing weight load from the WIG craft with use of excess pressure in the static and dynamic air cushions and additionally remove weight load through use of vertical component of thrust force; and m) securing additional controllability and additional thrust force due to a "Bartini effect" and multiplication of velocity of flow passing through the SSP.

REFERENCES

1. N. Belavin "Wing-in-ground effect craft." Leningrad, Sudostroenije, 1968.
2. A. I Maskalik et al, "WIG Craft—transports of the XXI Century." St. Pb., Sudostroenije, 2005.
3. RU Patent 2076816
4. U.S. Pat. No. 3,190,582
5. RU Patent 2185979
5. U.S. Pat. No. 3,244,246
6. U.S. Pat. No. 3,908,783
7. U.S. Pat. No. 5,335,742
8. K. G. Udalov et al, "VVA-14 Airplane", Moscow, 1994.
9. Tekhnika Molodyozhi Magazine, No. 8, 2005, Russia, pages 29-32.
10. RU Patent 2099217
11. "Ekranoplani Ukraini", "Awiatsija obschego nasnatschenija" Magazine No. 5, 2000, Ukraine.
12. RU Patent 2224671
13. Kornev, <<COMPLEX NUMERICAL MODELING OF DYNAMICS AND CRASHES OF WING-IN-GROUND VEHICLES>> 41st Aerospace Sciences Meeting and Exhibit, 6-9 Jan. 2003, Reno, Nev.
14. RU Patent 2018465
15. RU Patent 209722
16. RU Patent 2224671
17. RU Patent 2102287
18. RU Patent 2174080
19. RU Patent 2053903
20. RU Patent 21272202
21. Certificate of Authorship SU 1511170
22. RU Patent 2139212
23. RU Patent 2185979
24. RU Patent 2254250
25. U.S. Pat. No. 6,158,540
26. I. V. Ostoslaysky, V. R. Matveyev, works of the Central Aerohydrodynamics Institute (TsAGI) named after Prof. N. E. Zhukovsky. Issue 248. Moscow, 1935
27. U.S. Pat. No. 6,848,650

28. SU Patent 1786768
29. patent RU 2254250 C2 B 60 V 1/08.

LIST OF POSITION AND DESIGNATIONS TO
FIGURES OF THE INVENTION

1—forward low aspect ratio wing (LAW);
2—leading-edge flap;
3—semiannular section of the upper surface of LAW;
4—flaperons of the forward LAW;
5—the rear and subsequent low aspect ratio wings (LAW);
6—shrouded-screw propulsor (SSP);
7—engine;
8—flaperons of the rear (subsequent) LAW(s);
9—wing-end surface of LAW;
10—wing-end aerodynamic plate-floats (APF);
11—cavity for static air cushion (SAC);
12—cavity for dynamic air cushion (DAC);
13—cavity for static-and-dynamic air cushion (SDAC);
14—internal surface of wing-end aerodynamic plate-float;
15—upper edges of wing-end aerodynamic plate-floats;
16—additional low aspect ratio wing (ALAW);
17—leading-edge elevator (elevon);
18—nose elevator (elevon);
19—outer wing;
20—slats;
21—ailerons;
22—elevons of outer wing;
23—spoiler;
24—stabilator (all moving tailplane);
25—center wing (CW);
26—two-fin (four-fin) vertical tail;
27—rudders;
28—thrust vector control planes;
29—ASP ring;
30—upper surface of the forward LAW;
31—leading edge of the rear (subsequent) LAW(s);
32—leading edge of the forward LAW flaperons;
33—lower surface of the rear LAW;
34—air duct;
35—slipstream (jet) from the lower half of shrouded-screw propulsor (SSP);
36—push-pull control linkage;
37—setting angle between the plane of LAW flaperons and the plane of angle of attack sensors (AAS);
38—forward lift force;
39—rear lift force;
40—focus in terms of height;
41—center of gravity;
42—point of midway between the focuses;
43—focus in terms of angle of attack;
44—slipstream (jet) from the upper half of SSP;
45—SSP intake air flow;
46—lower surface of the forward LAW;
47—cockpit;
48—entrance door (hatch);
49—windows of cockpit and passenger cabin;
50—inflatable float;
51—low-pressure tyres;
52—aerodynamic fairing;
53—automatic gun turret;
54—emergency (additional) hatch;
55—fuselage;
56—tunnel;
57—transom plate;
58—skeg;
59—hydroski;
60—nose flap of fuselage;
61—upward inclination section of skeg keel line;
62—cargo/passenger door;
63—rotary section of LAW with propulsion unit;
64—fixed section of LAW;
65—lower surface of fuselage (bottom);
66—transom flap;
67—float—rigid half-hull;
68—approximate borderline of dynamic air cushion;
69—fender bar;
70—upper surface of additional LAW—deck;
Y—lift force.
$Y_1$—forward lift force.
$Y_2$—rear lift force.
$\Delta Y$—lift increment.
G—gravity (mass).
P—thrust of propulsive unit.
Pv—vertical component of thrust.
PH—horizontal component of thrust.
M—restoring moment.

The invention claimed is:

1. A wing-in-ground effect craft (WIG craft) comprising:
a fuselage having a nose flap and a transom plate, said nose flap and said transom plate each being retractable;
at least one propulsion unit;
at least one forward low-aspect-ratio wing (LAW) extending out from said fuselage, said at least one forward LAW having at least one leading-edge flap, at least one flaperon, said at least one forward LAW being mounted with setting angles of attack;
at least one rear LAW extending out from said fuselage, said at least one rear LAW having at least one flaperon, said at least one rear LAW being mounted with setting angles of attack and which overlaps in a horizontal plane a portion of said at least one forward LAW, a leading edge of said at least one rear LAW being positioned above a leading edge of said flaperon of said at least one forward LAW for creating an air duct through which a slipstream from a lower half of said propulsion unit;
at least two aerodynamic plate-floats (APFs) each joined to a free end of said at least one forward LAW and a free end of said at least one rear LAW respectively; and
a system for controlling said at least one forward LAW flaperon capable of parallel control of deflection both with a control stick and from an angle of attack sensor (AAS);
wherein a static air cushion (SAC) cavity is defined under said forward and rear LAWs within boundaries of its projection onto a horizontal plane, a dynamic air cushion (DAC) cavity is defined under said at least one forward LAW, and a cavity for static and dynamic air cushions (SDAC) is defined under said at least one rear LAW.

2. The wing-in-ground effect craft according to claim 1 further comprising enclosures of said SAC, DAC and SDAC composed of at least one of internal surfaces of said at least two APFs, side and lower surfaces of said fuselage, said nose flap, said transom plate, and said flaperons of said at least one forward LAW and said at least one rear LAW, said enclosures of said static air cushions being retractable, and wherein said system for controlling said at least one forward LAW flaperons is through automatic longitudinal stabilization and a damping channel which includes a subsystem for control of an angle between a plane of neutral, in terms of roll, position of said flaperon and a plane of neutral position of said AAS.

3. A wing-in-ground effect craft (WIG craft) comprising:
a fuselage having a nose flap and a transom plate, said nose flap and said transom plate each being retractable;

at least one shrouded-screw propulsor (SSP) having a SSP ring, and at least one engine;

at least one load-carrying low-aspect-ratio wing (LAW) being in a form of at least one low-aspect-ratio center wing (CW), which is composed, in a longitudinal direction, of a forward LAW and at least one rear LAW, said forward LAW having at least one leading-edge flap, and at least one flaperon, said at least one rear LAW having at least one flaperon, said forward and rear LAWs each having LAW wing-end surfaces, said forward and rear LAWs are mounted with setting angles of attack and with covering (overlap) in a horizontal plane, a leading edge of said at least one rear LAW being positioned above a leading edge of said flaperon of said at least one forward LAW thus creating an air duct through which a slipstream from a lower half of said at least one SSP flows;

at least two wing-end aerodynamic plate-floats (APFs) being joined to said LAW wing-end surfaces of said forward and rear LAWs, each of said at least two APFs having an upper edge positioned higher than upper surfaces of said forward and rear LAWs for creating said air duct with low air pressure above said LAW and with formation of the following comprising:

a static air cushion (SAC) cavity under said CW, within boundaries of its projection onto the horizontal plane;

a dynamic air cushion (DAC) cavity under said forward LAW;

a cavity for static and dynamic air cushions (SDAC) under said at least one rear LAW;

enclosures of said SAC, DAC and SDAC are composed at least of internal surfaces of said at least two APFs, side and lower surfaces of said fuselage, said nose flap, said leading-edge flap, said transom plate each being retractable, and said forward and rear flaperons each being deflectable; and a system for control of said forward LAW flaperon capable of parallel control of deflection both with a control stick and from an angle of attack sensor (AAS) through automatic longitudinal stabilization and a damping channel which includes a subsystem for control of an angle between a plane of neutral, in terms of roll, position of said flaperon and a plane of neutral position of said AAS;

wherein said SSP ring of said shrouded-screw propulsor is mounted on said leading edge of said at least one rear LAW, said SSP ring being directed into said cavities for said SAC, DAC and SDAC, and said at least one engine is mounted within an inner volume of said LAW.

4. The wing-in-ground effect craft according to claim 3, wherein said at least one rear LAW further comprising a span being at least one of equal to, less than, and more than an inner diameter of said SSP ring, and said forward LAW further comprising a span which exceeds an outer diameter of said SSP ring, and wherein said SSP ring further comprising internal and external surfaces adjoined to internal side surfaces and upper edge surfaces of said at least two APFs, said side and upper surfaces of said fuselage and upper surfaces of said forward LAW with creation of a semi-annular surface area thereon which unfolds into an upper surface of said forward LAW with rectilinear generator, and thus forming a single base structural group comprising said at least one forward LAW, said at least one SSP, said at least one engine and said at least one rear LAW which, in combination with said at least two APFs makes up a propulsive carrying system of said WIG craft.

5. The wing-in-ground effect craft according to claim 3, wherein a chord of said forward LAW is 0.2 to 0.65 of equivalent chord of said center wing, being a distance from said leading edge of said forward LAW to a trailing edge of said at least one rear LAW.

6. The wing-in-ground effect craft according to claim 3, wherein said setting angle of said forward LAW is equal to a mean best angle of attack of said forward LAW for design range of cruise heights of ground effect flight, subject to effects of suction of a flow and boundary layer from said upper surface of said forward LAW.

7. The wing-in-ground effect craft according to claim 3, wherein said flaperon of said forward LAW is of a slot configuration, and an axis of rotation said flaperon is positioned within 5-30% of a chord of said flaperon, and wherein said flaperon of said forward LAW has a span that is 5-30% less than said span of said forward LAW.

8. The wing-in-ground effect craft according to claim 3, wherein said at least one rear LAW is at least two rear LAWs each having a leading edge, wherein said leading edges of said at least two rear LAWs are arranged in a plane parallel to a main plane of said WIG craft, and wherein said leading edges of said at least two rear LAWs are arranged stepwise, that is with increasing positioning height of said leading edges in a tail-direction, wherein airfoil chords and setting angles of said at least two rear LAWs are at least even in said tail-direction.

9. The wing-in-ground effect craft according to claim 3, wherein said center wing is fitted with a stabilator mounted above said flaperons of said at least one rear LAW and inside the boundaries of said slipstream, for providing longitudinal balance, aerodynamic deceleration and reversing during taxiing, take-off and landing, and in cruise mode acting as operating element of a system for longitudinal stabilization and damping pitch fluctuations.

10. The wing-in-ground effect craft according to claim 9 further comprising a nose elevator positioned within undisturbed stream and mounted on one of a nose part of said fuselage, a nose part of said at least two APFs, and between a nose part of said fuselage and at least one of said APFs, wherein a positioning height of said nose elevator above a main plane being greater than a mean aerodynamic chord of said nose elevator.

11. The wing-in-ground effect craft according to claim 10, wherein said nose elevator serves as said AAS for at least one of said flaperon of said forward LAW and is linked therewith by means of a control linkage which allows for remote variation of said setting angle between a plane of said nose elevator and said plane of said flaperon of said forward LAW, and for complete disengagement thereof, and said stabilator and is linked therewith by means of a control linkage.

12. The wing-in-ground effect craft according to claim 3 further comprising a system for control of said flaperon of said at least one rear LAW which allows for parallel control both with control sticks and with a tail AAS over an additional control channel for automatic longitudinal stabilization and damping which includes a subsystem for control of said angle between the plane of neutral, in terms of roll, position of said flaperon and said plane of neutral position of said tail AAS.

13. The wing-in-ground effect craft according to claim 12, wherein a tail elevator serves as said tail AAS for said flaperon of said at least one rear LAW and is linked therewith by means of a control linkage which allows for remote variation of said setting angle between the planes of said tail elevator and said flaperon of said at least one rear LAW, and for complete disengagement thereof.

14. The wing-in-ground effect craft according to claim 3, wherein said lower surface of said fuselage being in a form of a boat hull having at least one stem arranged ahead of or behind said forward LAW, at least one keel positioned to serve as a support surface while said WIG craft stands on ground, said at least one keel lies in the same plane with support surfaces of said at least two APFs, wherein said support surface of said at least one keel and said at least two APFs being made damped, from a durable low-friction material in a form of hydroskis, and wherein lines of said at least one keel include an upward inclination sections within a range of lengths of said static-and-dynamic air cushion of said at least one rear LAW.

15. The wing-in-ground effect craft according to claim 3, wherein said lower surface of said fuselage being configured as a continuation of a lower surface of said at least one forward LAW which is in a form of a flat load carrying surface with said nose flap and said transom plate, together with said flaperon of said at least one rear LAW form an enclosure of said SAC, and are retractable in a stow position flush with said bottom of said fuselage during flight, and wherein said at least two APFs provide floatation of said WIG craft and are at least one of rigid streamlined gliding half-hulls, and inflatable balloons.

16. The wing-in-ground effect craft according to claim 3 further comprising additional LAWs and outer wings having positive setting angle of attack, and projection of said additional LAWs and outer wings resultant center of pressure onto a longitudinal axis lies between a center of gravity and said trailing edge of said center wing.

17. The wing-in-ground effect craft according to claim 3 further comprising at least one spoiler pivot-mounted starting from an upper leading edge section of said forward LAW.

18. The wing-in-ground effect craft according to claim 3 further comprising inlets provided on said upper surfaces of said at least one forward LAW and said at least one rear LAW, said inlets are in communication with orifices provided on an internal surface of said SSP ring by means of pipelines, said inlets provide a system for suction of a boundary layer of said upper surfaces of said at least one forward LAW and said at least one rear LAW.

19. The wing-in-ground effect craft according to claim 3, wherein said at least one SSP further comprising thrust vector control planes which are horizontally mounted to said at least one SSP, said thrust vector control planes each having an airfoil section and is swing-mounted in a form of a grid so that trailing edges of each of said thrust vector control planes lie in a plane that is parallel to a plane of a leading edge of said SSP ring, and wherein said at least one rear LAW or a section thereof, which said at least one SSP is mounted to is configured to move about a lateral axis thereof up to a vertical position of thrust vectors.

20. A method of using a wing-in-ground-effect craft (WIG craft) to allow integrated increase in aerodynamic and cargo-carrying characteristics, said method comprising the steps of:
a) generating required lift force (LF) using a high air pressure region between a load-carrying low-aspect-ratio wing (LAW) and a supporting surface, and by way of blowing off flow from an upper surface of said LAW;
b) creating progressive motion using thrust propulsion units, pitch, roll and yaw controls, wherein that a natural character of dependence of a magnitude of said lift force and locations of focuses of said low-aspect-ratio wing on angle of attack and height of flight is changed via creation, in longitudinal direction, of at least one a forward region of lift force generation and at least one rear region of lift force generation;
c) projections of focuses onto a longitudinal axis ahead of and behind a center of gravity (CG), through the use of at least one forward LAW, at least one rear LAW and at least two aerodynamic plate-floats (APFs), said at least one forward LAW having a leading edge flap, a semiannular section of an upper surface and flaperons, said at least one rear LAW having with at least one shrouded-screw propulsor (SSP), at least one engine and flaperons, said at least two APFs being joined wing-to end surfaces of said at least one forward LAW and said at least one rear LAW;
d) creating different conditions of flow of air streams around said at least one forward LAW and said at least one rear LAW;
e) forming a static air cushion (SAC), a dynamic air cushion (DAC) and a static-and-dynamic air cushion (SDAC) under said at least one forward LAW and said at least one rear LAW;
f) creating a low air pressure region with reduced irregularity in a longitudinal direction above said WIG craft, with mutual compensation of moments of lift forces of said forward and read regions of generation of said lift forces, relative to the center of gravity, and positions of the focus in terms of height ahead of the center of gravity, and of the focus in terms of angle of attack behind the center of gravity, which is positioned between the focus in terms of height and a point of midway between the focuses;
g) allowing for interaction of undisturbed free approach air with a lower surface and partially with an upper surface of said at least one forward LAW;
h) reducing the interaction of the undisturbed free approach air with said upper surface of said at least one forward LAW through suction of air layer over an entire span of said upper surface with said at least one SSP, and interaction thereof with lower and upper surfaces of said at least one rear LAW is prevented by blowing off said lower and upper surfaces of said at least one rear LAW over an entire span with said at least one SSP;
i) controlling magnitudes of said forward and rear lift forces through variations of at least one of deflection angles of said flaperons of said at least one forward LAW and said at least one rear LAW, and power setting of said at least one SSP;
j) (1) stabilizing the flight and dampening pitch fluctuations through automatic variation of forward lift force magnitude as a function of pitch angle as strong reversed feedback, the variations being effected by way of dynamic control of positions of said at least one forward LAW flaperon to actuating devices of which control inputs from an angle of attack sensor (AAS) are transmitted;
j) (2) stabilizing the flight and dampening pitch fluctuations through automatic variation of rear lift force magnitude as a function of pitch angle as strong positive feedback, the variations being effected by way of dynamic control of positions of said rear LAW flaperon to actuating devices of which control inputs from an angle of attack sensor (AAS) are transmitted;
k) using said at least one SSP to create progressive motion, blow off and suck flow from upper surfaces of load-carrying planes;
l) removing weight load from said WIG craft with use of excess pressure in said static and dynamic air cushions and additionally remove weight load through use of vertical component of thrust force; and
m) securing additional controllability and additional thrust force due to a "Bartini effect" and multiplication of velocity of flow passing through said at least one SSP.

* * * * *